US008462359B2

(12) United States Patent
Koike

(10) Patent No.: US 8,462,359 B2
(45) Date of Patent: Jun. 11, 2013

(54) POSITION MEASURING DEVICE

(75) Inventor: Naoki Koike, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 9 days.

(21) Appl. No.: 12/957,984

(22) Filed: Dec. 1, 2010

(65) Prior Publication Data

US 2011/0317173 A1 Dec. 29, 2011

(30) Foreign Application Priority Data

Jun. 23, 2010 (JP) ............................... P2010-142770

(51) Int. Cl.
*G01B 11/14* (2006.01)

(52) U.S. Cl.
USPC ........... 356/620; 356/498; 356/622; 101/106; 101/107; 101/337; 399/263; 399/111; 702/19; 702/150

(58) Field of Classification Search
USPC .................. 101/106, 107, 330–337; 356/498, 356/620, 622; 399/263, 111, 119, 25; 702/19, 702/150–153
See application file for complete search history.

(56) References Cited

U.S. PATENT DOCUMENTS 6,697,761 B2 * 2/2004 Akatsuka et al. ............. 702/151
6,982,798 B1 * 1/2006 Silverbrook et al. ......... 101/106
2002/0052709 A1 5/2002 Akatsuka et al.
2008/0286014 A1 11/2008 Saito et al.
2011/0235054 A1 * 9/2011 Koike et al. .................. 356/620

FOREIGN PATENT DOCUMENTS

JP 2002-90118 3/2002
JP 2003-254716 9/2003
JP 2006-10610 1/2006
JP 2008-286861 11/2008

OTHER PUBLICATIONS

Fujiwara, T. et al., "A Method for Performance Analysis of Athlete using Firefly . . . ", http://www.ipsj.or.jp/10jigyo/fit/fit2007/fit2007program/html/event/pdf/6C21.pdf.

* cited by examiner

*Primary Examiner* — Gregory J Toatley
*Assistant Examiner* — Iyabo S Alli
(74) *Attorney, Agent, or Firm* — Sughrue Mion, PLLC

(57) ABSTRACT

A position measuring device includes a plurality of concave marks, a light source portion, a light receiving portion, and a concave portion measuring portion. The concave marks are formed on an external wall of an object to be a measuring target. Each of the plurality of the concave marks includes a plurality of concave portions disposed on a concentric circle with a preset concave mark central position to be a center of the concentric circle. The concave portions are provided so that densities of the concave portions become lower as distances from the concave mark central position become longer in each of the concave marks. The light source portion irradiates the object with an irradiating light. The light receiving portion receives a reflected light from the object, the refracted light being originated from the irradiating light. The concave portion measuring portion measures each three-dimensional position of the concave marks.

8 Claims, 20 Drawing Sheets

TCy (TCm, TCc, TCk)

POSITION MEASURING DEVICE

CROSS-REFERENCE TO RELATED APPLICATIONS

This application is based upon and claims priority under 35 USC 119 from Japanese Patent Application No. 2010-142770, filed Jun. 23, 2010.

BACKGROUND

1. Technical Field

The present invention relates to a position measuring device.

2. Related Art

In the case in which an electronic apparatus such as an image forming apparatus is automatically assembled, each component is held and attached to another component or is picked up and moved onto a belt conveyer according to an example of a component delivering member. At this time, an automatic assembling apparatus recognizes a posture of the component or a type of the component to move means for gripping the component depending on a posture thereof, that is, a so-called manipulator, thereby gripping the component.

SUMMARY OF THE INVENTION

According to an aspect of the invention, a position measuring device includes a plurality of concave marks, a light source portion, a light receiving portion, and a concave portion measuring portion. The concave marks are formed on an external wall of an object to be a measuring target. Each of the plurality of the concave marks includes a plurality of concave portions disposed on a concentric circle with a preset concave mark central position to be a center of the concentric circle. The concave portions are provided so that densities of the concave portions become lower as distances from the concave mark central position become longer in each of the concave marks. The light source portion irradiates the object with an irradiating light. The light receiving portion receives a reflected light from the object, the refracted light being originated from the irradiating light. The concave portion measuring portion measures each three-dimensional position of the concave marks.

BRIEF DESCRIPTION OF THE DRAWINGS

Exemplary embodiments of the invention will be described in detail based on the following figures, wherein.

DETAILED DESCRIPTION

Figure 1:
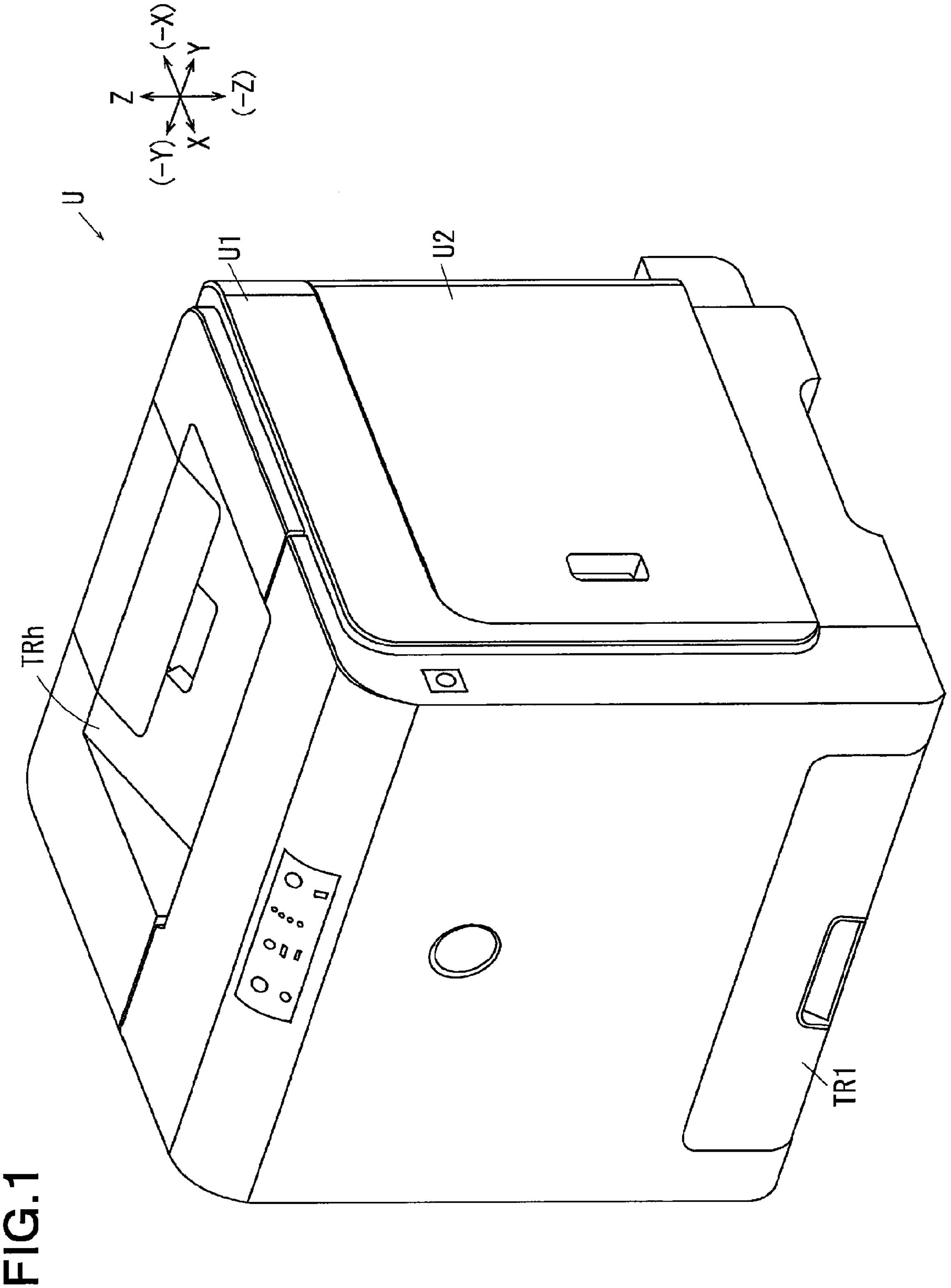
FIG. 1 is an explanatory view showing an image forming apparatus using a container according to an example of a target for which a position measuring device according to a first example of the invention is utilized.

Next, examples to be specific examples of an exemplary embodiment according to the invention will be described with reference to the drawings and the invention is not restricted to the following examples.

For easy understanding of the following description, in the drawings, a longitudinal direction is set to be an X-axis direction, a transverse direction is set to be a Y-axis direction and a vertical direction is set to be a Z-axis direction, and directions or sides shown in arrows X, −X, Y, −Y, Z and −Z are set to be forward, rearward, rightward, leftward, upward and downward directions or front, rear, right, left, upper and lower sides, respectively.

In the drawings, moreover, "○" having "•" described therein implies an arrow from a back side toward a right side in a paper and "○" having "×" described therein implies an arrow from the right side toward the back side in the paper.

In the following explanation using the drawings, an illustration of members other than necessary members for the description to ease understanding will be omitted properly.

FIRST EXAMPLE

FIG. 1 is an explanatory view showing an image forming apparatus using a container according to an example of a target for which a position measuring device according to a first example of the invention is utilized.

Figure 2:
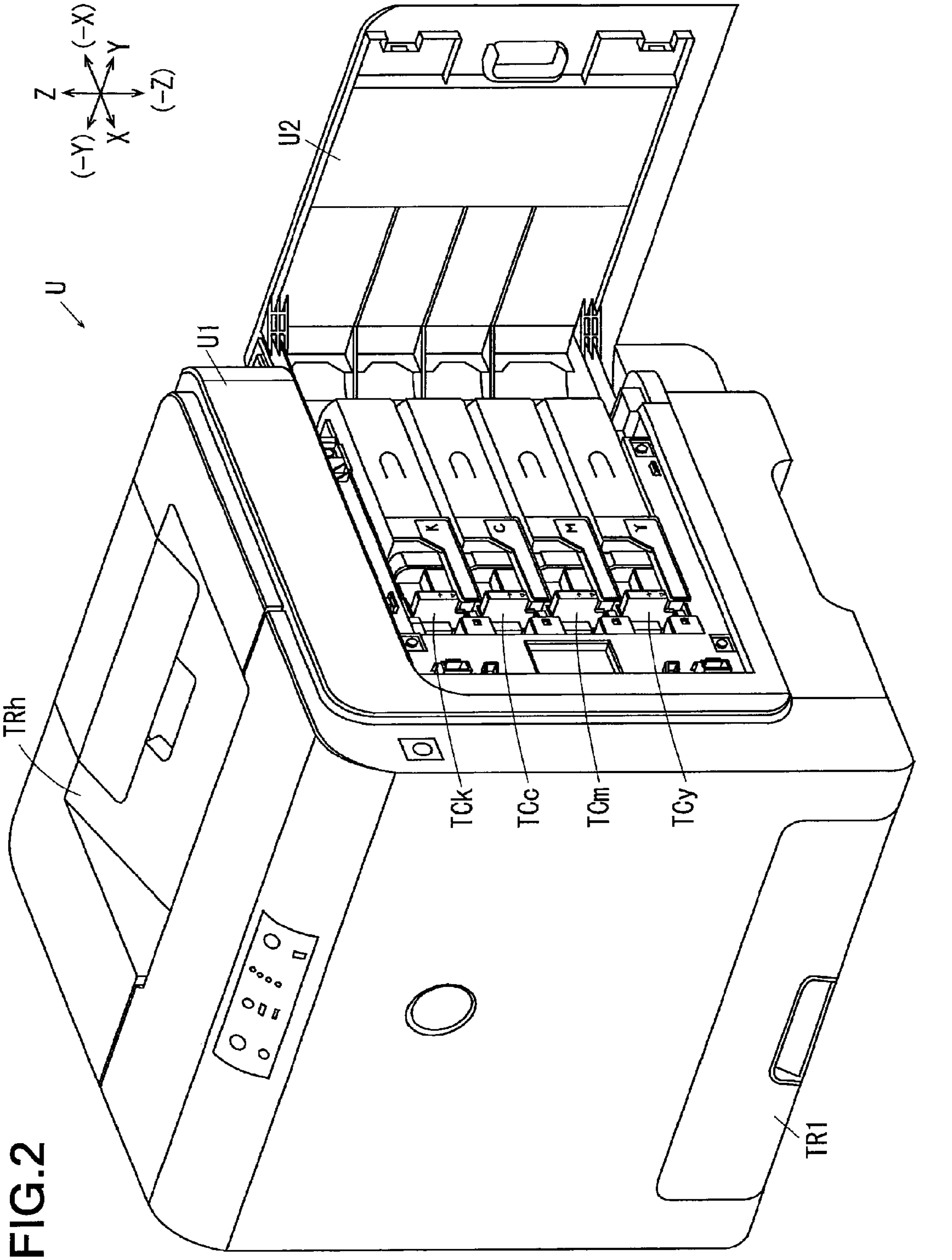
FIG. 2 is an explanatory view showing a state in which a side door is opened in the image forming apparatus illustrated in FIG. 1.

FIG. 2 is an explanatory view showing a state in which a side door is opened in the image forming apparatus illustrated in FIG. 1.

In FIGS. 1 and 2, a printer U according to an example of the image forming apparatus has a printer body U1 according to an example of an image forming apparatus body.

A paper feeding tray TR1 according to an example of a medium supplying portion for accommodating a medium on which an image is to be recorded is supported on a lower part of the printer body U1 in such a manner that it may be put in/out in a longitudinal direction. A discharging tray TRh according to an example of a medium discharging portion for discharging a medium having an image formed thereon is provided on an upper surface of the printer body U1. A side cover U2 according to an example of an opening/closing member is supported openably around a rear end at a right side surface of the printer body U1. Toner cartridges TCy, TCm, TCc and TCk having four colors of yellow, magenta, cyan and black according to an example of a container for supplying a novel developer or collecting an evacuating developer are removably attached to an inside of the side cover U2. In the case in which a work for exchanging the toner cartridges TCy to TCk is carried out, the side cover U2 is opened/closed.

Figure 3:
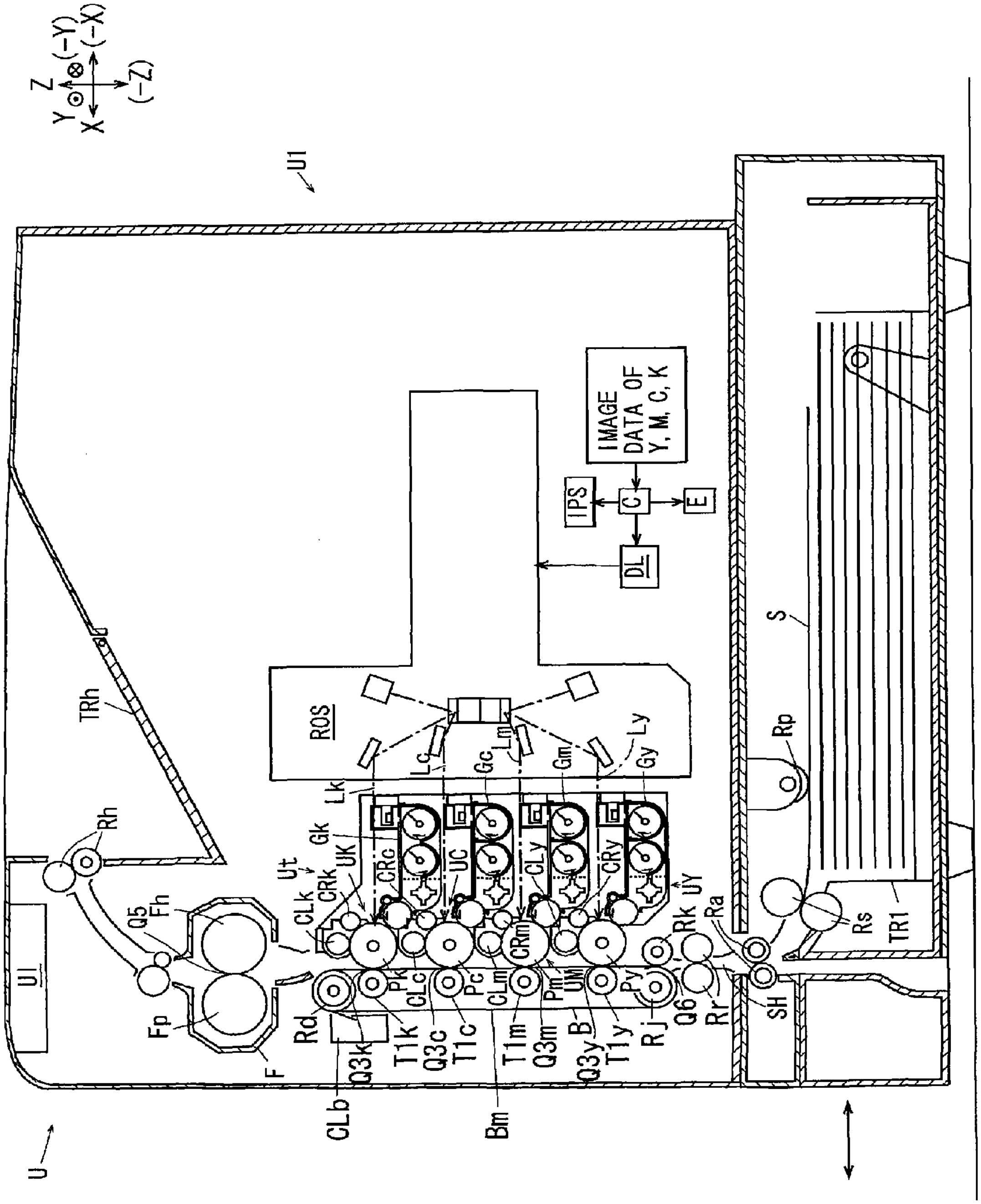
FIG. 3 is a schematically explanatory view showing the image forming apparatus illustrated in FIG. 1.

FIG. 3 is a schematically explanatory view showing the image forming apparatus illustrated in FIG. 1.

In FIG. 3, the printer U has a control portion C for variously controlling the printer U, and an image processing portion IPS, a write driving circuit DL and a power device E of which operations are controlled by the control portion C. The power device E applies a voltage to charging rollers CRy to CRk according to an example of chargers which will be described below, a developing roller according to an example of a developer holding member and transfer rollers T1*y* and T1*k* according to an example of a transfer unit.

The image processing portion IPS converts print information input from an external image information transmitting device into image information for forming a latent image corresponding to images having four colors of K: black, Y: yellow, M: magenta and C: cyan and outputs the image information to the write driving circuit DL at a preset time. The write driving circuit DL outputs, to a latent image writing device ROS, a driving signal corresponding to the image information about the respective colors which are input. The latent image writing device ROS emits laser beams Ly, Lm, Lc and Lk according to an example of image writing lights having the respective colors in response to the driving signal.

In FIG. 3, visible image forming apparatuses UY, UM, UC and UK for forming toner images according to an example of visible images are disposed for the respective colors of Y, M, C and K in front of the latent image wiring device ROS.

The visible image forming apparatus UK for K has a photosensitive member Pk according to an example of an image holding member to be rotated. The charging roll CRk according to an example of a charger, a developing device Gk for developing, into a visible image, an electrostatic latent image on a surface of the photosensitive member, and a photosensitive cleaner CLk according to an example of an image holding member cleaner for removing a developer remaining on a surface of the photosensitive member Pk are disposed around the photosensitive member Pk.

In the photosensitive member Pk, the surface is uniformly charged by means of the charging roll CRk in a charging region which is opposed to the charging roll CRk, and a latent image is then written by the laser beam Lk in a latent image forming region. The electrostatic latent image thus written is developed into a visible image in a developing region which is opposed to the developing device Gk.

The visible image forming apparatus UK for the black color according to the first example is constituted by an image holding member cartridge which is formed integrally by the photosensitive member Pk, the charger CRk and the photosensitive cleaner CLk and is exchangeable, and a developing cartridge which is formed by the developing device Gk and is exchangeable.

The visible image forming apparatus UY, UM and UC for the other colors are constituted by image holding member cartridges and developing cartridges which are removable from the image forming apparatus body U1 in the same manner as the visible image forming apparatus UK for the black color. In the first example, the four visible image forming apparatuses UY to UK are supported on a removable frame member Ut, that is, a so-called exchanging frame Ut, and the four visible image forming apparatuses UY to UK are constituted to be integrally exchangeable with respect to the image forming apparatus body U1.

In FIG. 3, a belt module BM according to an example of a medium delivering device which is supported on the opening/closing portion U2 is disposed in front of the photosensitive members Py to Pk (a "+X" direction). The belt module BM has a medium delivering belt B according to an example of a medium delivering member, a belt support roll (Rd+Rj) according to an example of a delivering member support system including a belt driving roll Rd according to an example of a driving member for supporting the medium delivering belt B and a driven roll Rj according to an example of a driven member, transfer rolls T1*y*, T1*m*, T1*c* and T1*k* according to an example of transfer units which are disposed opposite to the photosensitive members Py to Pk, a belt cleaner CLb according to an example of a delivering member cleaner, and a medium adsorbing roll Rk according to an example of a recording medium adsorbing member which is disposed opposite to the driven roll Rj and serves to adsorb a recording medium S into the medium delivering belt B. However, the medium adsorbing roll Rk is not always necessary but may be omitted. The medium delivering belt B is rotatably supported by the belt support roll (Rd+Rj).

The recording media S in the paper feeding container TR1 disposed below the medium delivering belt B are taken out by means of a pickup roll Rp according to an example of a take-out member and are separated one by one by means of a sorting roll Rs according to an example of a sorting member, and are thus delivered to a medium delivering path SH.

The recording medium S in the medium delivering path SH is delivered to a downstream side by means of a medium delivering roll Ra according to an example of a medium delivering member and is fed to a register roll Rr according to an example of a paper feeding time regulating member. The register roll Rr delivers the recording medium S to a medium adsorbing position Q6 in an opposed region of the driven roll Rj and the medium adsorbing roll Rk at a preset time. The recording medium S delivered to the medium adsorbing position Q6 is electrostatically adsorbed into the medium delivering belt B.

The recording medium S adsorbed into the medium delivering belt B sequentially passes through transfer regions Q3*y*, Q3*m*, Q3*c* and Q3*k* provided in contact with the photosensitive members Py to Pk.

In the transfer regions Q3*y*, Q3*m*, Q3*c* and Q3*k*, transfer voltages having a charging polarity and a reverse polarity of the developer are applied from the power circuit E controlled by the control portion C to the transfer rolls T1*y*, T1*m*, T1*c* and T1*k* disposed on the back side of the medium delivering belt B.

In case of a multicolor image, the toner images on the photosensitive members Py to Pk are superposed and transferred onto the recording medium S over the medium delivering belt B by means of the transfer rolls T1*y*, T1*m*, T1*c* and T1*k*. In case of an image having a simple color, that is, a monochromatic image, moreover, only a K: black toner image is formed on the photosensitive member Pk. Only the K: black toner image is transferred onto the recording medium S by means of the transfer roller T1*k*.

In the photosensitive members Py to Pk subjected to the toner image transfer, a toner remaining on surfaces is collected and cleaned away by the photosensitive cleaners CLy to CLk. The photosensitive members Py to Pk are charged by the charging rolls CRy to CRk again.

The recording medium S having the toner image transferred thereto is heated and fixed in a passage through a fixing region Q5 formed by a pressure contact of a heating roll Fh according to an example of a heating and fixing member and a pressurizing roll Fp according to an example of a pressurizing and fixing member in a fixing device F. The recording medium S having the image fixed thereto is discharged to a medium discharging portion TRh through a discharging roller Rh according to an example of a medium discharging member.

The medium delivering belt B from which the recording medium S is taken away is cleaned by means of the belt cleaner CLb.

Figure 4:
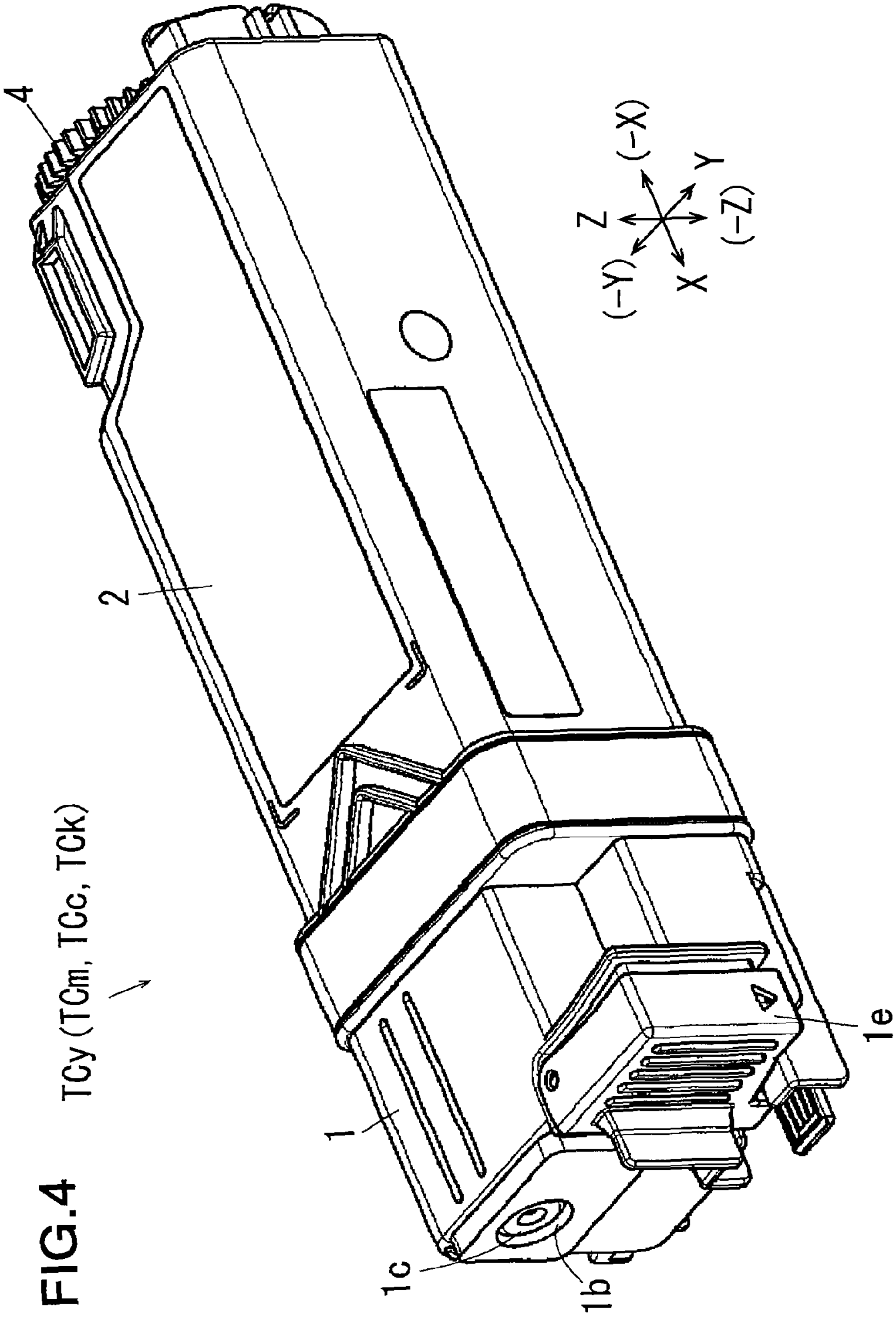
FIG. 4 is a perspective view showing a toner cartridge to be used in a printer illustrated in FIG. 1.

FIG. 4 is a perspective view showing a toner cartridge to be used in the printer illustrated in FIG. 1.

Figure 5B:
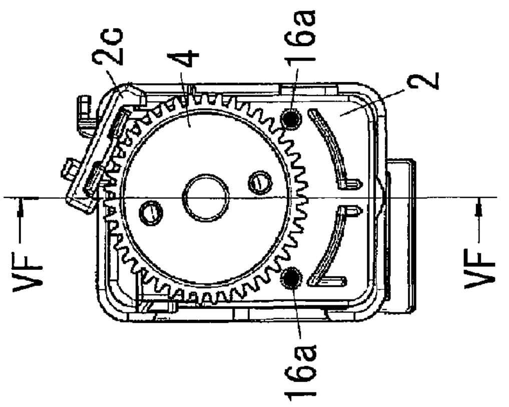
FIGS. 5A to 5F are explanatory views showing the toner cartridge illustrated in FIG. 4, FIG. 5A being a plan view, FIG. 5B being a view seen in a direction of an arrow VB in FIG. 5A, FIG. 5C being a sectional view taken along a VC-VC line in FIG. 5A, FIG. 5D being a sectional view taken along a VD-VD line in FIG. 5A, FIG. 5E being a sectional view taken along a VE-VE line in FIG. 5A, and FIG. 5F being a sectional view taken along a VF-VF line in FIG. 5B.
Figure 5A:
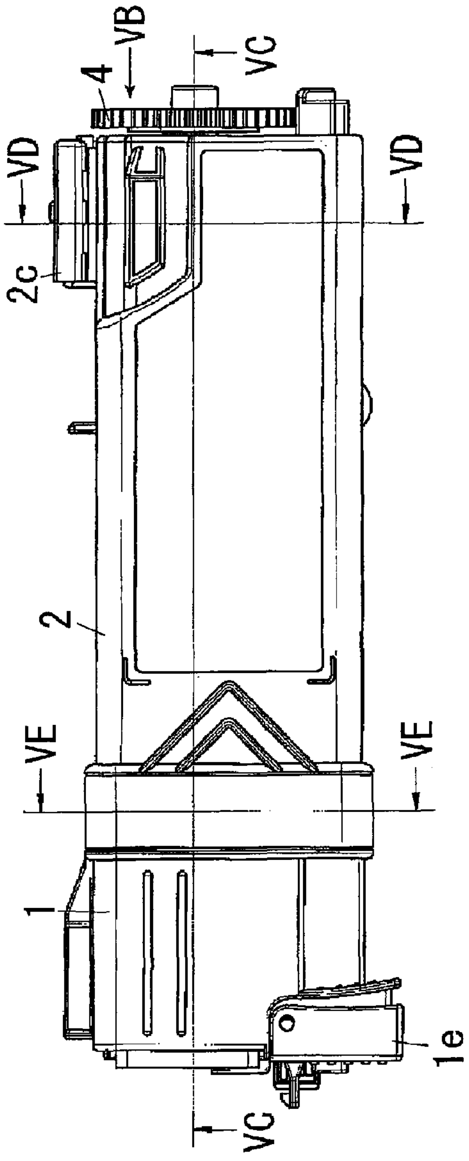
Figure 5C:
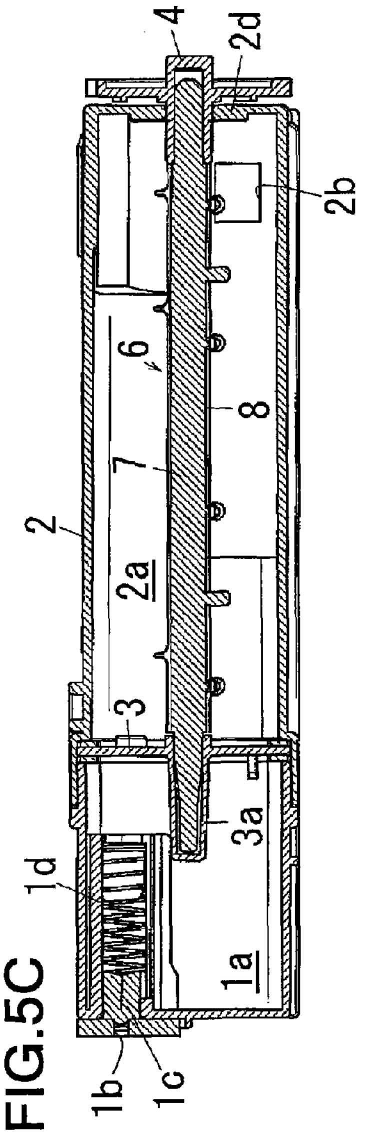
Figure 5F:
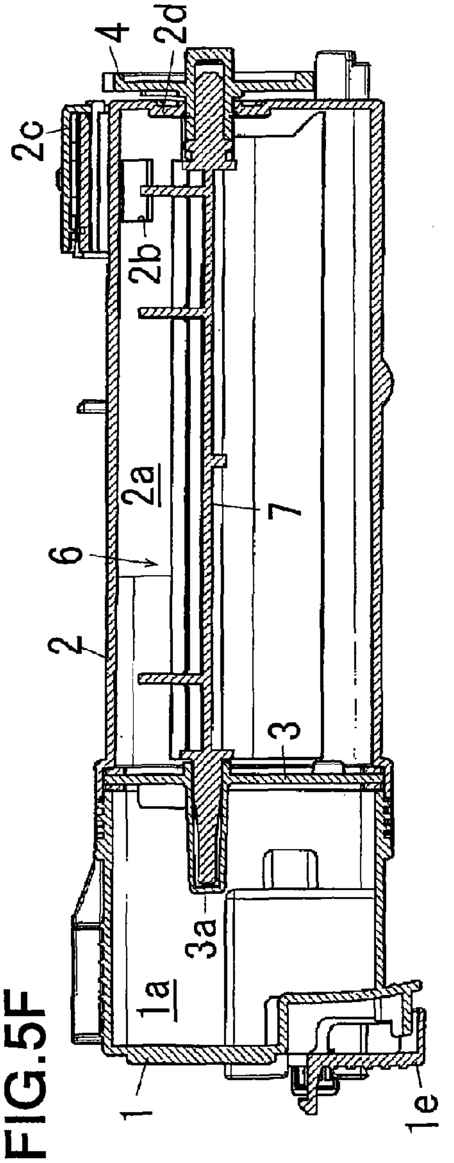
Figure 5D:
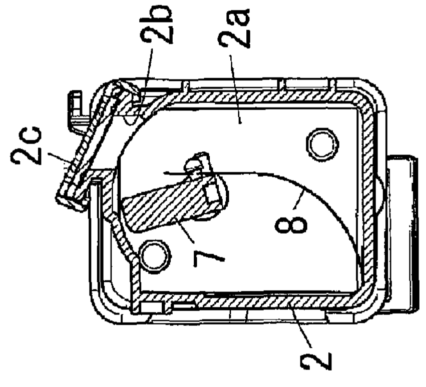
Figure 5E:
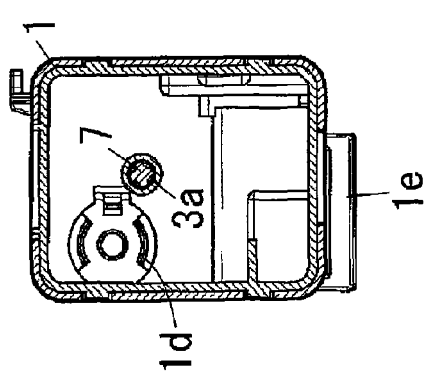

FIG. 5 is an explanatory view showing the toner cartridge illustrated in FIG. 4, and FIG. 5A is a plan view, FIG. 5B is a view seen in a direction of an arrow VB in FIG. 5A, FIG. 5C is a sectional view taken along a VC-VC line in FIG. 5A, FIG. 5D is a sectional view taken along a VD-VD line in FIG. 5A, FIG. 5E is a sectional view taken along a VE-VE line in FIG. 5A, and FIG. 5F is a sectional view taken along a VF-VF line in FIG. 5B.

Next, description will be given to the toner cartridges TCy to TCk to be used in the printer U. Since the toner cartridges TCy to TCk for respective colors have the same structure, the toner cartridge TCy for a yellow color will be described and explanation of the toner cartridges TCm, TCc and TCk for the other colors will be omitted.

In FIGS. 4 and 5, the toner cartridges TCy to TCk are formed to take a shape of a flat and almost rectangular parallelepiped in which a width in a horizontal direction is larger than a height in a vertical direction. Each of the toner cartridges TCy to TCk has a waste developer housing portion 1 on a front side in which a waste developer discharged from the printer body U1 is accommodated, a supply developer housing portion 2 on a rear side which accommodates a developer to be supplied when the developer is consumed by an image formation in the printer body U1, and a partition wall 3 for partitioning the waste developer housing portion 1 and the supply developer housing portion 2.

A waste developer housing space 1*a* for accommodating a waste developer is formed in the waste developer housing portion 1. An upper part on a left side of a front end face in the waste developer housing portion 1 is provided with a discarding side inlet 1*b* to which the waste developer is delivered and to which a waste developer delivering path (not shown) is connected through penetration when it is attached to the printer body U1. Accordingly, the waste developer discarded with an operation of the printer body U1 is delivered through the waste developer delivering path and is discarded into the waste developer housing space 1*a* through the discarding side inlet 1*b*. Moreover, an inlet shutter 1*c* according to an example of an inlet closing member is supported on the discarding side inlet 1*b*. The inlet shutter 1*c* serves to close the discarding side inlet, thereby preventing the waste developer stored in an inner part from leaking out when the waste developer delivering path is removed. The inlet shutter 1*c* is pushed in such a direction as to be always closed by means of a coil spring 1*d* according to an example of an elastic member, and is pushed toward a tip of the waste developer delivering path and is thus moved to an inside of the waste developer housing space 1*a* when the waste developer delivering path is connected.

Furthermore, a right side on the front end of the waste developer housing portion 1 is provided with an operating portion 1*e* to be operated by a user holding the toner cartridges TCy to TCk.

A supply developer housing space 2*a* for accommodating a supply developer therein is formed in the supply developer housing portion 2. A left lower side of a rear end of the supply developer housing container 2 is provided with a supply side outlet 2*b* connected to an inlet (not shown) at the printer body U1 side and serving to discharge the developer accommodated in the supply developer housing space 2*a* when it is attached to the printer body U1. An outlet shutter 2*c* according to an example of an outlet closing member is supported movably in a longitudinal direction at an outside of the supply side outlet 2*b* in order to close the supply side outlet 2*b* when the toner cartridge TCy is removed from the printer body U1.

A driven gear 4 according to an example of a driven transmitting member is rotatably supported on a rear end wall 2*d* of the supply developer housing portion 2. The driven gear 4 is engaged with a driving operation transmitting member (not shown) of the printer body U1 to transmit the driving operation in a state in which the toner cartridge TCy is attached to the printer body U1.

In FIGS. 5C to 5F, an agitator 6 according to an example of a developer delivering member extended in a longitudinal direction is disposed in the supply developer housing portion 2.

The agitator 6 has a rotating shaft 7 extended in the longitudinal direction and a film member 8 according to an example of a delivering member body supported on the rotating shaft 7 and an example of a thin film member.

Figure 6A:
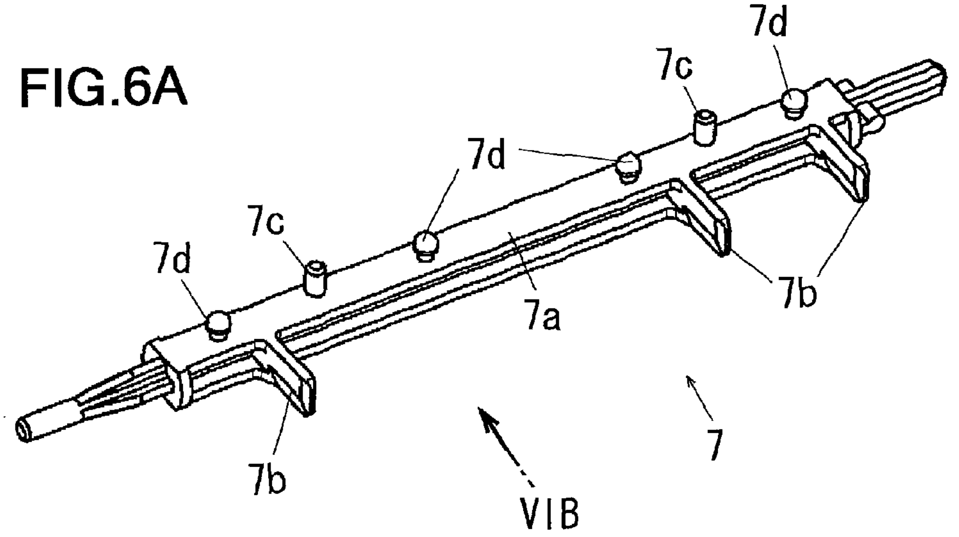
FIGS. 6A and 6B are explanatory views showing a rotating shaft of an agitator to be used in the toner cartridge, FIG. 6A being a perspective view and FIG. 6B being a side view seen in a direction of an arrow VIB in FIG. 6A.
Figure 6B:
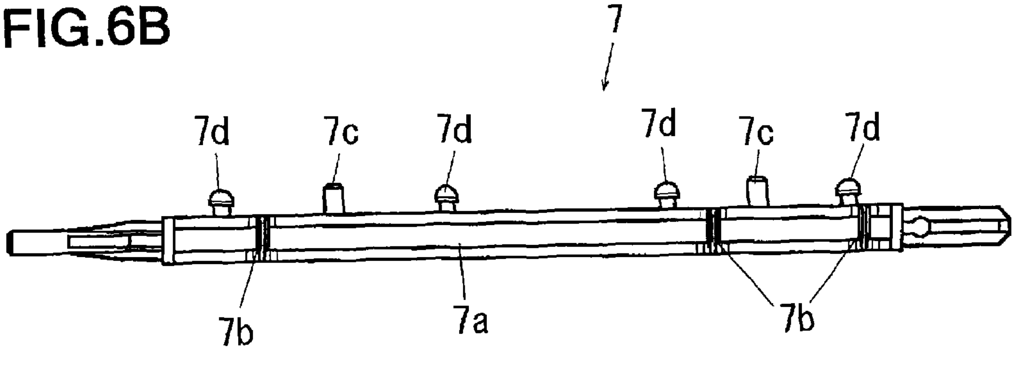

FIG. 6 is an explanatory view showing a rotating shaft of the agitator to be used in the toner cartridge, and FIG. 6A is a perspective view and FIG. 6B is a side view seen in a direction of an arrow VIB in FIG. 6A.

In FIG. 6, the rotating shaft 7 has a rotating shaft body 7*a* extended in a longitudinal direction and taking a shape of a quadratic prism. A plurality of agitating portions 7*b* for agitating a developer is protruded outward at one of side surfaces of the rotating shaft body 7*a*. Two film positioning convex portions 7*c* are formed as an example of a delivering member body positioning portion at one of the side surfaces of the rotating shaft body 7*a* which is different from the side surface for the agitating portion 7*b*. A film fixing portion 7*d* according to an example of a delivering member body fixing portion formed to take a shape of a mushroom is provided on both front and rear sides of the film positioning convex portion 7*c*.

In FIG. 5, a front end of the rotating shaft 7 is rotatably supported by an end support portion 3*a* formed on the partition wall 3 and taking a concave shape. A rear end of the rotating shaft 7 is coupled to the driven gear 4 supported on the rear end wall 2*d* of the supply developer housing portion 2, and is rotated integrally when a driving operation is transmitted to the driven gear 4.

Figure 7:
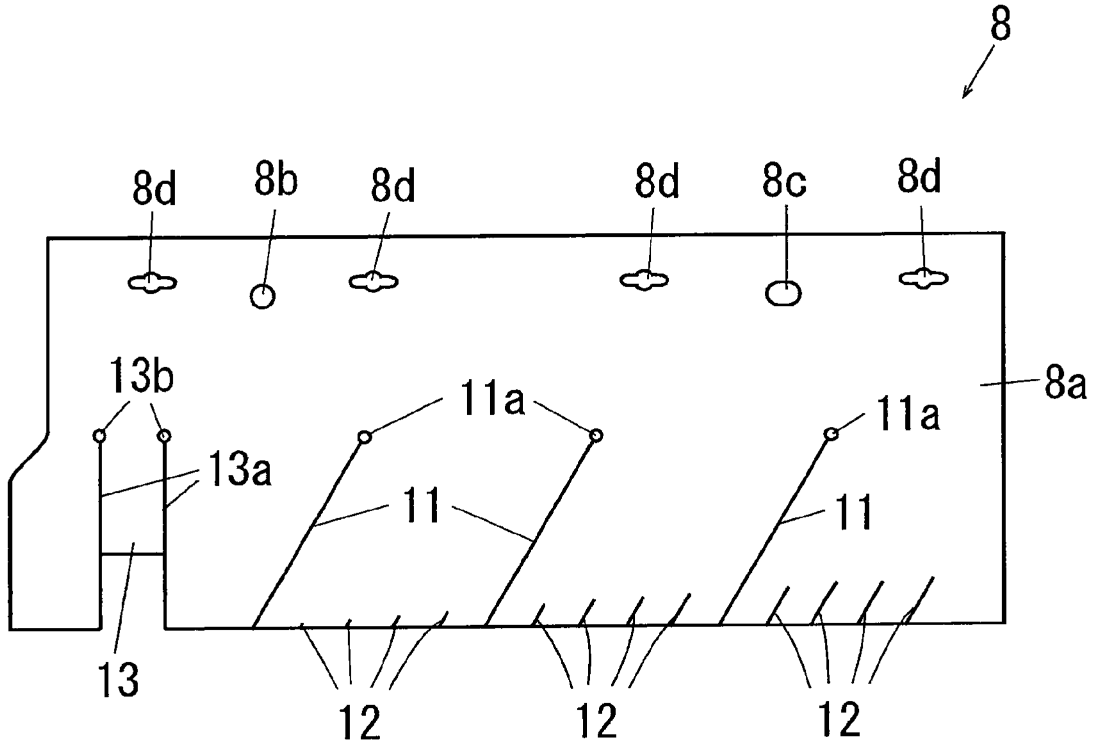
FIG. 7 is an explanatory view showing a film member according to an example of a delivering member body of the agitator according to the first example.

FIG. 7 is an explanatory view showing a film member according to an example of a delivering member body of the agitator in accordance with the first example.

In FIG. 7, the film member 8 has a rectangular thin film-shaped film body 8*a* according to an example of a polygon. In the first example, a film formed of PET (polyethylene terephthalate) having a thickness of approximately 100 μm is used. Positioning holes 8*b* and 8*c* are formed corresponding to positions in which two film positioning convex portions 7*c* of the rotating shaft 7 are disposed at a base end of the film body 8*a* which is supported on the rotating shaft 7. Referring to the positioning holes 8*b* and 8*c*, one of them is constituted by a round hole 8*b* and the other is constituted by a slot 8*c* in order to carry out positioning.

Fixed holes 8*d* are formed at both ends of the positioning holes 8*b* and 8*c* corresponding to positions in which the film fixing portions 7 are disposed. The fixed hole 8*d* is formed to take such a shape that a round hole is provided on a central part of a slit, and is elastically deformed to cause the film fixing portion 7*d* to pass therethrough in a penetration thereof, and furthermore, the film fixing portion 7*d* is prevented from being slipping off through a tip portion taking the shape of the mushroom after the passage. The positioning holes 8*b* and 8*c* and the fixed hole 8*d*, and the film positioning convex portion 7*c* and the film fixing portion 7*d* are set in such a manner that all intervals of an arrangement in an axial direction of the positioning hole 8*b*, the positioning hole 8*c* and the fixed hole 8*d* are different to prevent the film member 8 from being attached to the rotating shaft 7 reversely at both sides. In other words, the positioning holes 8*b* and 8*c* and the fixed hole 8*d*, and the film positioning convex portion 7*c* and the film fixing portion 7*d* are disposed in order to prevent an erroneous assembly of the rotating shaft 7 and the film member 8.

A plurality of main delivering cut portions 11 is formed at a predetermined interval on an edge portion at a free end side of the film body 8*a*, that is, one of sides at the free end side of the film body 8*a* which takes a rectangular shape. The main delivering cut portion 11 is tilted toward a rear side to be the supply side outlet 2*b* side. A cut growth preventing portion 11*a* taking a shape of a round hole is formed on an end at a base end side of the main delivering cut portion 11 in order to prevent a cut from being grown during use. A plurality of auxiliary delivering cut portions 12 is formed between the main delivering cut portions 11. The auxiliary delivering cut portion 12 is formed to have a cut which is gradually enlarged apart from the supply side outlet 2*b*. In other words, the auxiliary delivering cut portion 12 is formed to have the cut which is gradually enlarged apart from the supply side port 2*b* in order to enable an efficient delivery of the developer accommodated in the supply developer housing space 2*a* toward the supply side outlet 2*b*.

A jam preventing portion 13 is provided in a corresponding position to the supply side outlet 2*b* in the axial direction of the rotating axis 7 in the film body 8*a*. The jam preventing portion 13 according to the first example is constituted by a portion surrounded by a pair of cut portions 13*a* formed in a radial direction of the rotating shaft 7, and a cut growth preventing portion 13*b* is also formed on an end at a base end side of the cut portion 13*a* in the jam preventing portion 13. The jam preventing portion 13 cyclically enters the supply side outlet 2*b* with a rotation of the rotating shaft 7 and breaks the developer stuck to the supply side outlet 2*b*. In other words, the jam preventing portion 13 is provided to prevent the jam of the developer at the supply side outlet 2*b* which is discharged toward a tilted side in a direction of gravity, thereby stabilizing the supply.

Accordingly, the film member 8 according to the first example is provided with the main delivering cut portion 11, the auxiliary delivering cut portion 12 and the cut portion 13*a* according to an example of the cut at one of sides which is the free end side.

In order to prevent the cut from being grown and broken by a force received from the developer in a rotation, the cut growth preventing portions 11*a* and 13*b* are formed in the main delivering cut portion 11 and the jam preventing portion 13 which have large cuts and on which a great force is apt to act.

As shown in FIG. 5D, in the first example, the film body 8*a* is set to have such a free length as to be rotated in contact with an inner peripheral surface of the supply developer housing space 2*a* in a flexing state. Moreover, the jam preventing portion 13 is rotated in contact with the inner peripheral surface of the supply developer housing space 2*a* in the flexing state, and furthermore, is formed to have a smaller free length that the other film body 8*a*.

When a driving operation is transmitted to the driven gear 7 so that the rotating shaft 7 is rotated, accordingly, the film member 8 is also rotated so that the developer in the supply developer housing portion 2 is delivered toward the supply side outlet 2*b* through the oblique delivering cut portions 11 and 12 and is thus supplied toward the printer body U1.

Since the toner cartridges TCy to TCk are well-known and described in JP-A-2008-286861 Publication, for instance, the other detailed description will be omitted.

(Explanation of Marker)

Figure 8:
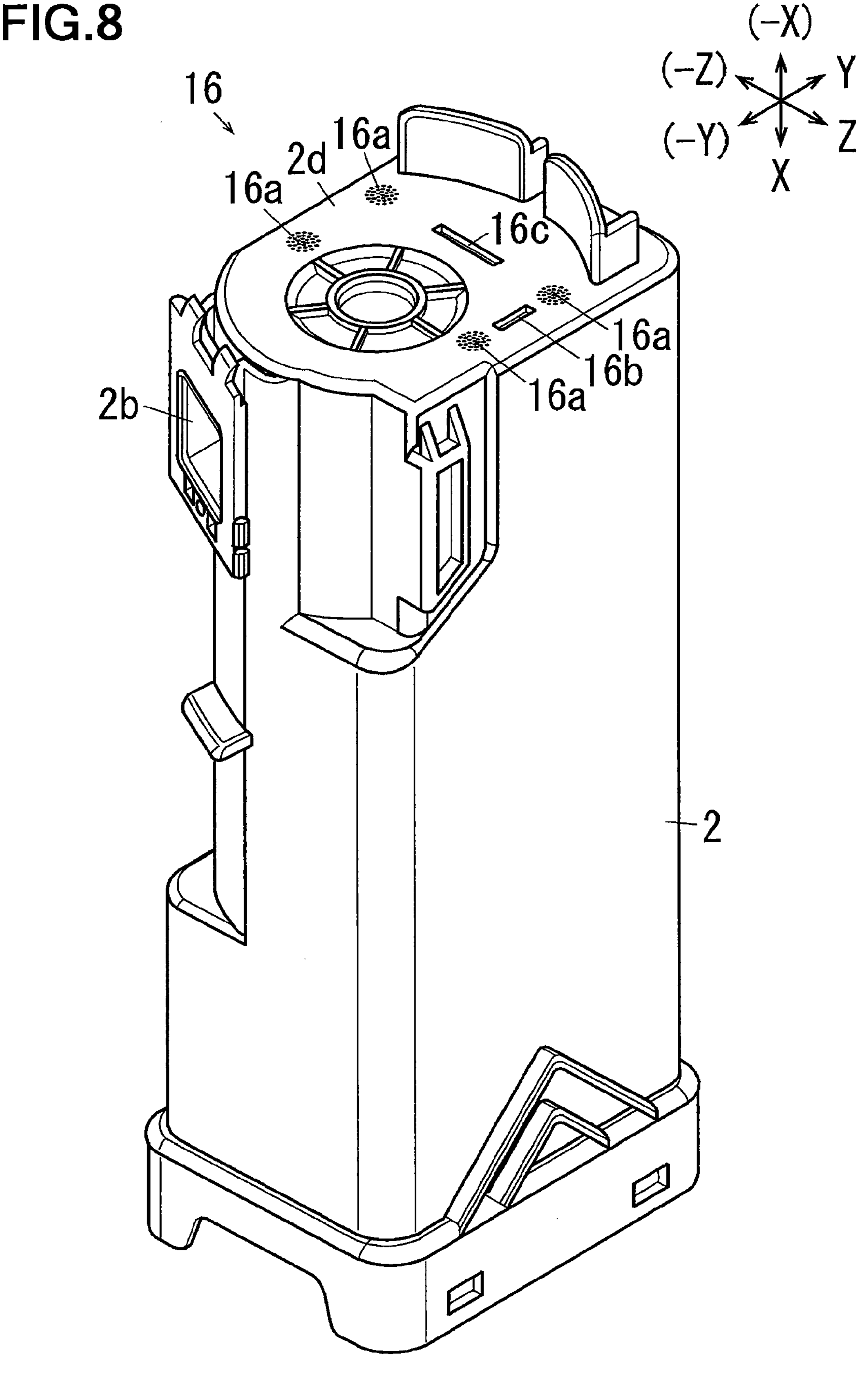
FIG. 8 is an explanatory view showing a component of a supply developer housing portion according to the first example.

FIG. 8 is an explanatory view showing a component of the supply developer housing portion according to the first example.

In FIGS. 4 and 5, the toner cartridges TCy to TCk according to the first example are assembled by fixing the agitator 6 and the driven gear 4 to the supply developer housing portion 2 according to an example of a target and attaching the partition wall 3, and then supporting the waste developer housing portion 1.

In FIGS. 5B and 8, in the supply developer housing portion 2 which has not been assembled, a marker 16 according to an example of a concave mark is formed on an outer surface side of the rear end wall 2*d* according to an example of an outer wall.

The marker 16 according to the first example has a so-called firefly catching marker 16*a* for a firefly catching measurement which is disposed in positions corresponding to four corners of a preset square. Moreover, a groove-shaped marker 16*b* extended in a transverse direction and a groove-shaped marker 16*c* extended in a vertical direction are formed as an example of an orientation measuring detected portion between two upper firefly catching markers 16*a* and two right firefly catching markers 16*a*.

Figure 9A:
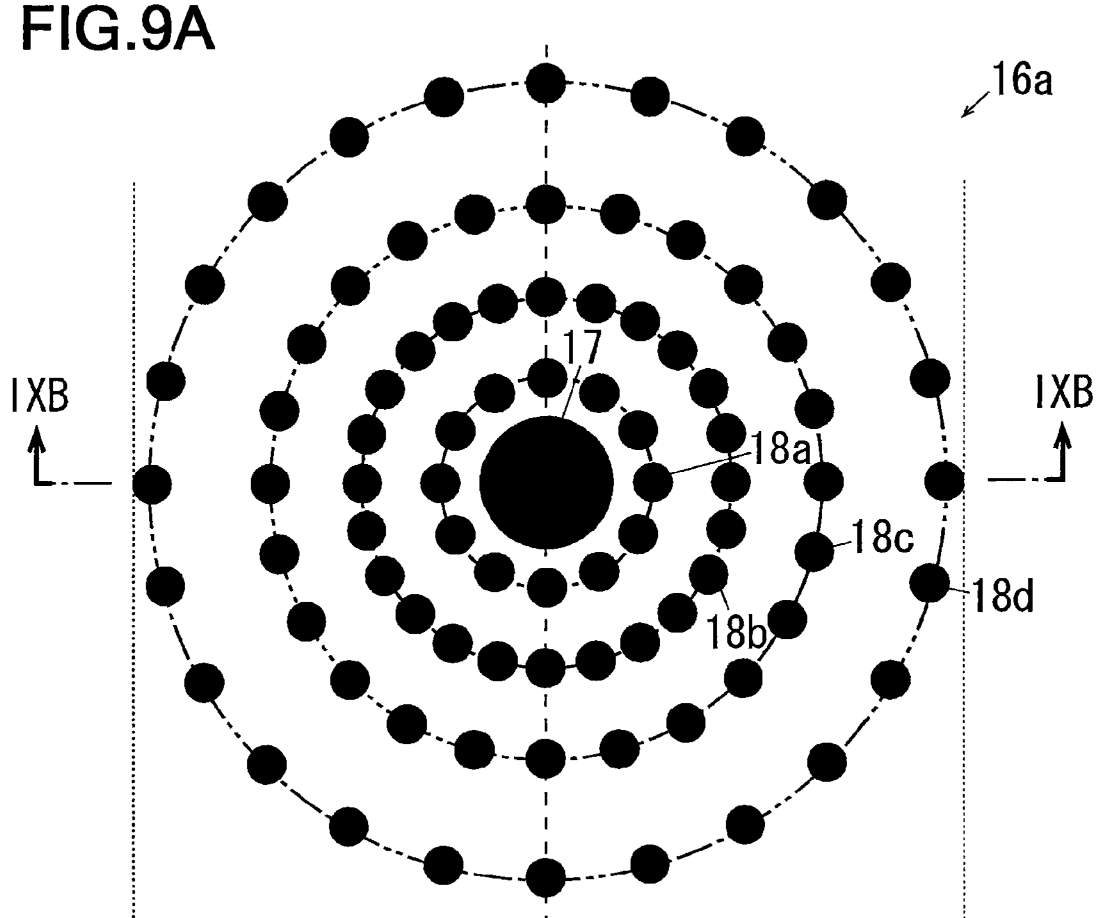
FIGS. 9A and 9B are explanatory views showing a marker according to an example of a concave mark according to the first example, FIG. 9A being an enlarged view showing a main part of the marker and FIG. 9B being a sectional view taken along an IXB-IXB line in FIG. 9A.
Figure 9B:
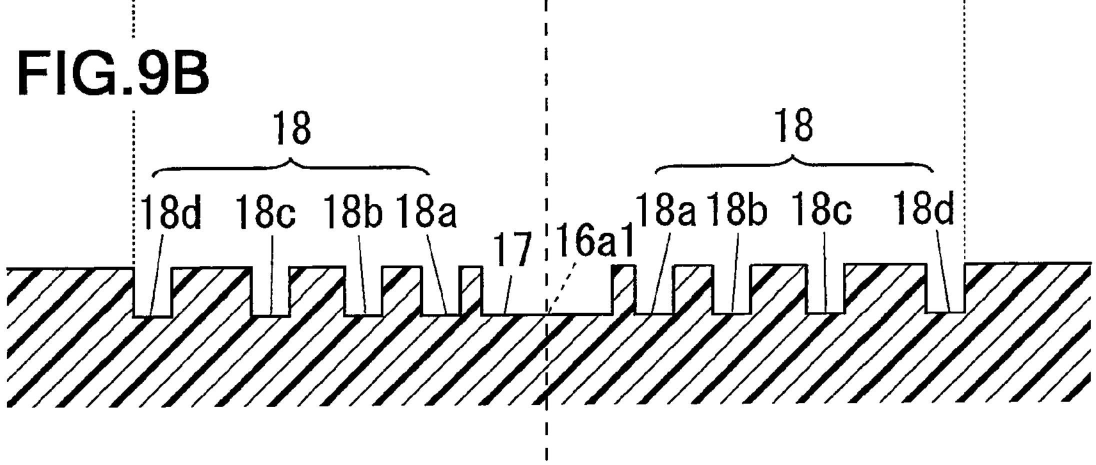

FIG. 9 is an explanatory view showing a marker according to an example of the concave mark in accordance with the first example, and FIG. 9A is an enlarged view showing a main part of the marker and FIG. 9B is a sectional view taken along an IXB-IXB line in FIG. 9A.

In FIG. 9, the firefly catching marker 16*a* according to the first example has a central concave portion 17 according to an example of a first concave portion which is formed in a preset concave mark central position 16*a*1 and a peripheral edge concave portion 18 according to an example of a plurality of second concave portions which is disposed on a concentric circle setting the concave mark central position 16*a*1 as a center. The peripheral edge concave portion 18 according to the first example is disposed on four concentric circles and includes a first peripheral edge concave portion 18*a* having the smallest radius of the concentric circle, a second peripheral edge concave portion 18*b* having the second smallest radius of the concentric circle, a third peripheral edge concave portion 18*c* having the third smallest radius of the concentric circle, and a fourth peripheral edge concave portion 18*d* having the largest radius of the concentric circle.

The central concave portion 17 and the peripheral edge concave portion 18 according to the first example take a circular shape seen on a plane as shown in FIG. 9A and a rectangular shape seen on a section as shown in FIG. 9B, that is, is constituted by a cylindrical concave portion. In the first example, the central concave portion 17 is formed to take a cylindrical shape having a diameter of 1 mm and a depth of 0.5 mm.

The first peripheral edge concave portion 18*a* has a center thereof disposed on a concentric circle having a radius of 0.8 mm from the concave mark central position 16*a*1. Twelve first peripheral edge concave portions 18*a* in total are disposed at an interval of 30 degrees over the concentric circle. Each of the peripheral edge concave portions 18*a* is formed to take a cylindrical shape having a diameter of 0.3 mm and a depth of 0.5 mm.

The second peripheral edge concave portion 18*b* has a center thereof disposed on a concentric circle having a radius of 1.4 mm from the concave mark central position 16*a*1. Eighteen second peripheral edge concave portions 18*b* in total are disposed at an interval of 20 degrees over the concentric circle. In the same manner as the first peripheral edge concave portion 18*a*, each of the peripheral edge concave portions 18*b* is formed to take a cylindrical shape having a diameter of 0.3 mm and a depth of 0.5 mm.

The third peripheral edge concave portion 18*c* has a center thereof disposed on a concentric circle having a radius of 2.1 mm from the concave mark central position 16*a*1. Twenty-four third peripheral edge concave portions 18*c* in total are disposed at an interval of 15 degrees over the concentric circle. In the same manner as the first peripheral edge concave portion 18*a*, each of the peripheral edge concave portions 18*c* is formed to take a cylindrical shape having a diameter of 0.3 mm and a depth of 0.5 mm.

The fourth peripheral edge concave portion 18*d* has a center thereof disposed on a concentric circle having a radius of 3 mm from the concave mark central position 16*a*1. Twenty-four fourth peripheral edge concave portions 18*d* in total are disposed at an interval of 15 degrees over the concentric circle. In the same manner as the first peripheral edge concave portion 18*a*, each of the peripheral edge concave portions 18*d* is formed to take a cylindrical shape having a diameter of 0.3 mm and a depth of 0.5 mm.

In the firefly catching marker 16*a* according to the first example, accordingly, only the central concave portion 17 is formed to have a large hole diameter and the peripheral edge concave portions 18*a* to 18*d* have hole diameters set to be equal to each other. Intervals in the radial direction of the peripheral edge concave portions 18*a* to 18*d* are set to be gradually increased, for instance, 1.4−0.8=0.6 mm, 2.1−1.4=0.7 mm and 3−2.1=0.9 mm apart from the concave mark central position 16*a*1. As shown in FIG. 9A, accordingly, the whole firefly catching marker 16*a* has an array which may be recognized in such a manner that densities and concentrations of the concave portions 17 and 18*a* to 18*d* are gradually increased toward the concave mark central position 16*a*1 side and are gradually reduced toward the peripheral edge portions.

(Explanation of Marker Forming Method)

Figure 10:
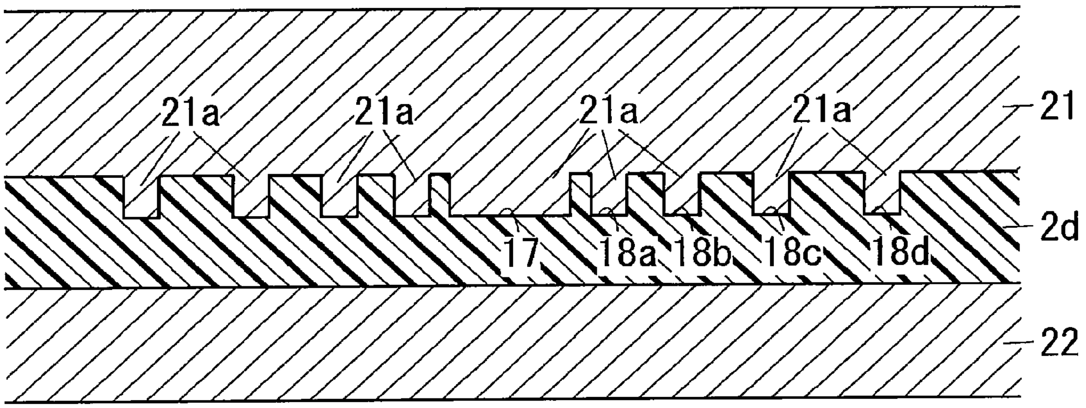
FIG. 10 is an explanatory view showing a marker forming method according to the first example.

FIG. 10 is an explanatory view showing a method of forming the marker according to the first example.

In FIG. 10, the supply developer housing portion 2 according to the first example is molded by causing a resin to flow into a space between molds 21 and 22. The marker 16 is formed integrally with the supply developer housing portion 2 through a convex marker applying portion 21*a* corresponding to the concave marker 16 according to an example of an applying portion formed in the mold 21 when molding the supply developer housing portion 2 formed by a resin.

Although there is illustrated the structure in which the marker 16 is formed by the marker applying portion 21*a* provided in the mold 21 in the first example, the invention is not restricted thereto but it is also possible to employ a method of forming the marker 16 by pressing a member having the heated marker applying portion 21*a* against the supply developer housing portion 2 after molding the supply developer housing portion 2 in the case in which the supply developer housing portion 2 is formed by a thermoplastic resin, for instance. In addition, it is also possible to employ a method of forming the marker 16 by pressing the marker applying portion 21*a* having a tip portion taking a shape of a blade or a peak against the supply developer housing portion 2 subjected to the molding.

(Explanation of Pallet)

Figure 11:
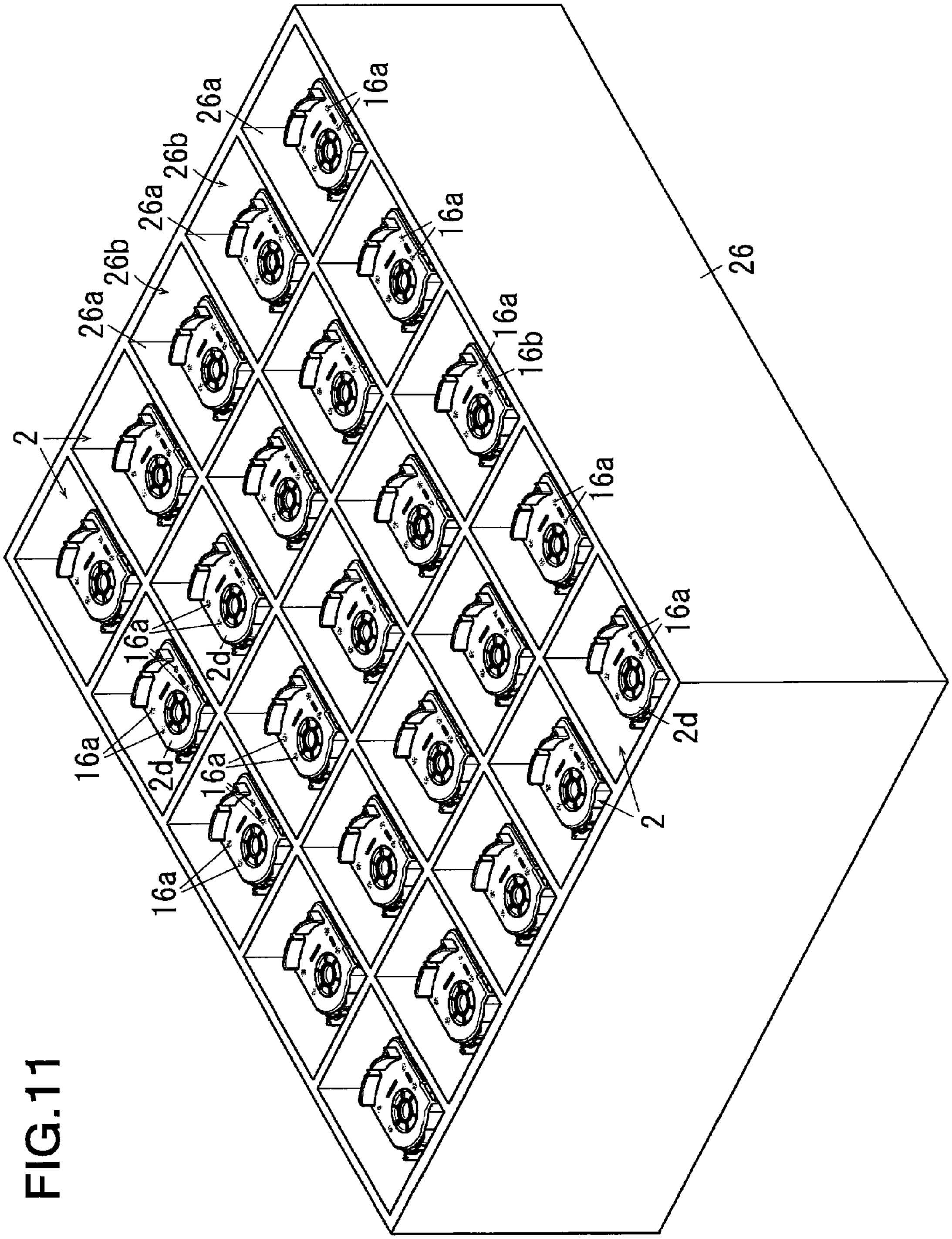
FIG. 11 is an explanatory view showing a pallet accommodating the supply developer housing portion according to an example of a target in accordance with the first example.

FIG. 11 is an explanatory view showing a pallet which accommodates the supply developer housing portion according to an example of the target in accordance with the first example.

In FIG. 11, the supply developer housing portion 2 according to the first example is molded by a molding device which is not shown, and is then accommodated in a pallet 26 according to an example of a container in which a plurality of housing portions 26*b* is formed in an inner part through a partition with a partitioning member 26*a*. In FIG. 11, the supply developer housing portion 2 is accommodated in the pallet 26 according to the first example with a longitudinal direction set along an inserting/removing direction into/from the housing portion 26*b* and is accommodated in such a manner that a front end having no convex member formed thereon is placed on an inner side in the inserting direction in order to enhance an accommodation efficiency of the supply developer housing portion 2 taking a slender and almost prismatic shape. In other words, the supply developer housing portion 2 is accommodated in the pallet 26 in a state in which the marker 16 on the rear end wall 2*d* is exposed to an outside.

(Explanation of Position Measuring Device)

Figure 12:
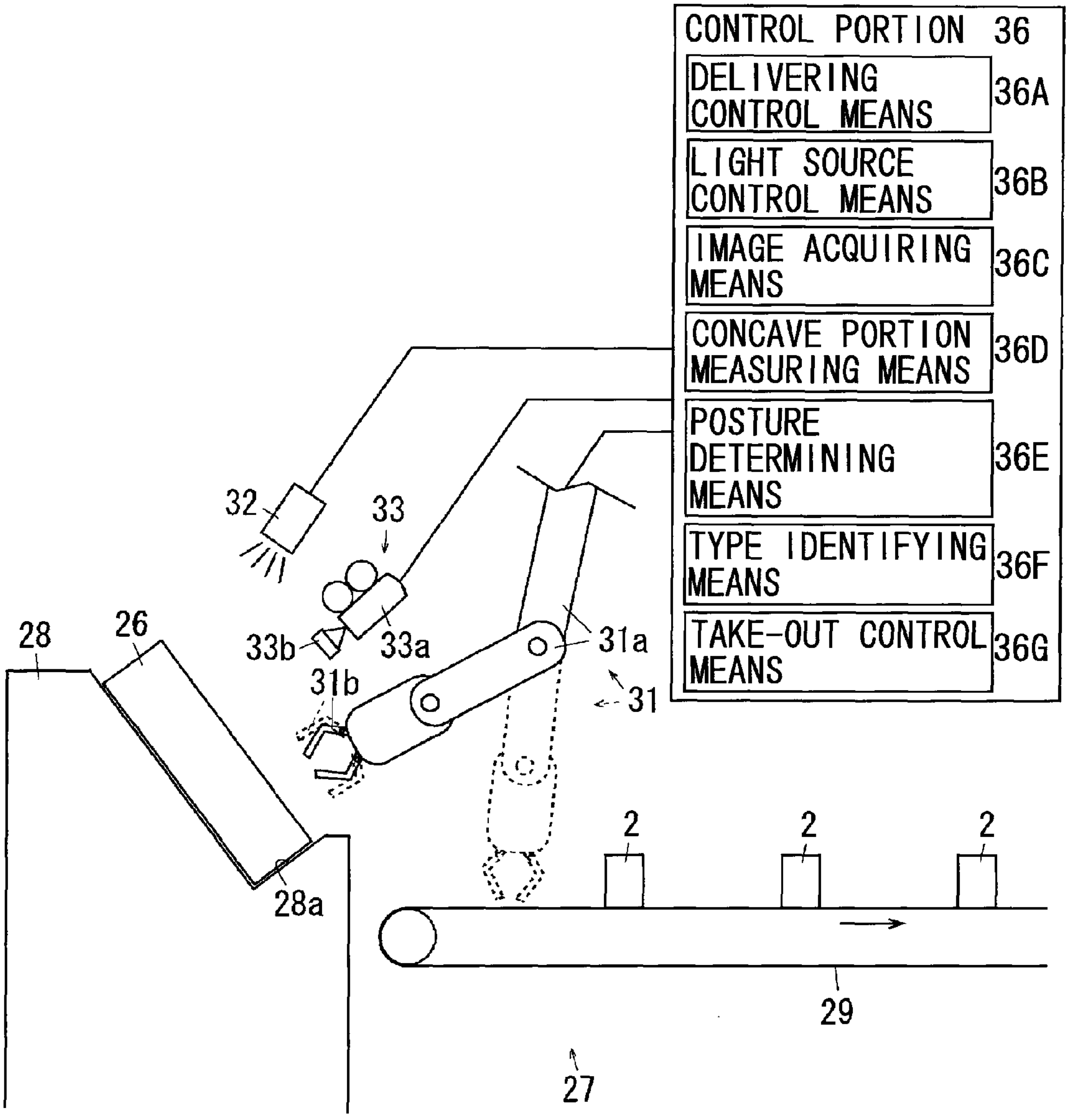
FIG. 12 is a general explanatory view showing a position measuring device according to the first example.

FIG. 12 is an explanatory view showing a whole position measuring device according to the first example.

The supply developer housing portion 2 accommodated in the pallet 26 is stored and transported in an accommodating state in the pallet 26 and is used for assembling the toner cartridges TCy to TCk through an assembling device 27 for carrying out an assembling operation shown in FIG. 12.

In FIG. 12, the assembling device 27 according to the first example has a pallet table 28 according to an example of a container support portion on which the pallet 26 is put and supported. The pallet table 28 according to the first example has a tilt support surface 28*a* for supporting the pallet 26 in an oblique tilting state in such a manner that the supply developer housing portion 2 may easily be taken out of the pallet 26.

A lateral part of the pallet table 28 is provided with a belt conveyor 29 according to an example of a delivering device for delivering the supply developer housing portion 2 put on an upper surface toward an assembling device (not shown) for assembling another component such as the agitator 6.

A manipulator 31 according to an example of a take-out moving device is disposed above the belt conveyer 29. The manipulator 31 serves to take the supply developer housing portion 2 out of the pallet 26 and to put the same supply developer housing portion 2 on the belt conveyer 29. In the manipulator 31 according to the first example, a plurality of links 31*a* according to an example of arm portions is rotatably coupled to each other, and furthermore, a hand portion 31*b* according to an example of a manual portion is supported on a tip of the link 31*a*. Thus, the manipulator 31 is constituted by the conventionally well-known articulated manipulator which may carry out an operation for moving the link portion 31*a* through a driving operation of an actuator (not shown), for instance, a motor serving as a driving source or an oil pressure and an operation for holding or releasing the supply developer housing portion 2 through the hand portion 31*b*.

A lamp 32 according to an example of a light source portion and a firefly catching camera 33 according to an example of a light receiving portion are provided obliquely and upward from the pallet table 28. The lamp 32 serves to irradiate a light on the supply developer housing portion 2 in the pallet 26 supported on the pallet table 28. The firefly catching camera 33 is disposed corresponding to a position in which the light irradiated from the lamp 32 is regularly reflected by the rear end wall 2*d*. The firefly catching camera 33 according to the first example has a camera body 33*a* and a lens 33*b* according to an example of an optical system supported thereon. The camera body 33*a* is constituted by a CMOS sensor according to an example of an image pick-up member. The lens 33*b* is supported on the camera body 33*a* and serves to transmit the light irradiated from the lamp 32 and reflected by the supply developer housing portion 2 to the camera body 33*a*.

Moreover, the assembling device 27 includes a control portion 36. The control portion 36 according to the first example has an I/O input/output interface for inputting/outputting a signal from/to an outside and adjusting an input/output signal level, an ROM: read only memory storing a program and data for executing a necessary processing, an RAM: random access memory for temporarily storing necessary data, a CPU: central processing unit for executing a processing depending on a program stored in a hard disk or an ROM, and a clock oscillator.

The control portion 36 has the following means 36*a* to 36*h*.

The delivering control means 36*a* serves to control a driving operation of the belt conveyer 29.

The light source control portion 36*b* serves to control to turn on/off the lamp 32.

The image acquiring means 36*c* serves to acquire a light received by the camera 33, that is, an image picked up.

Figure 13A:
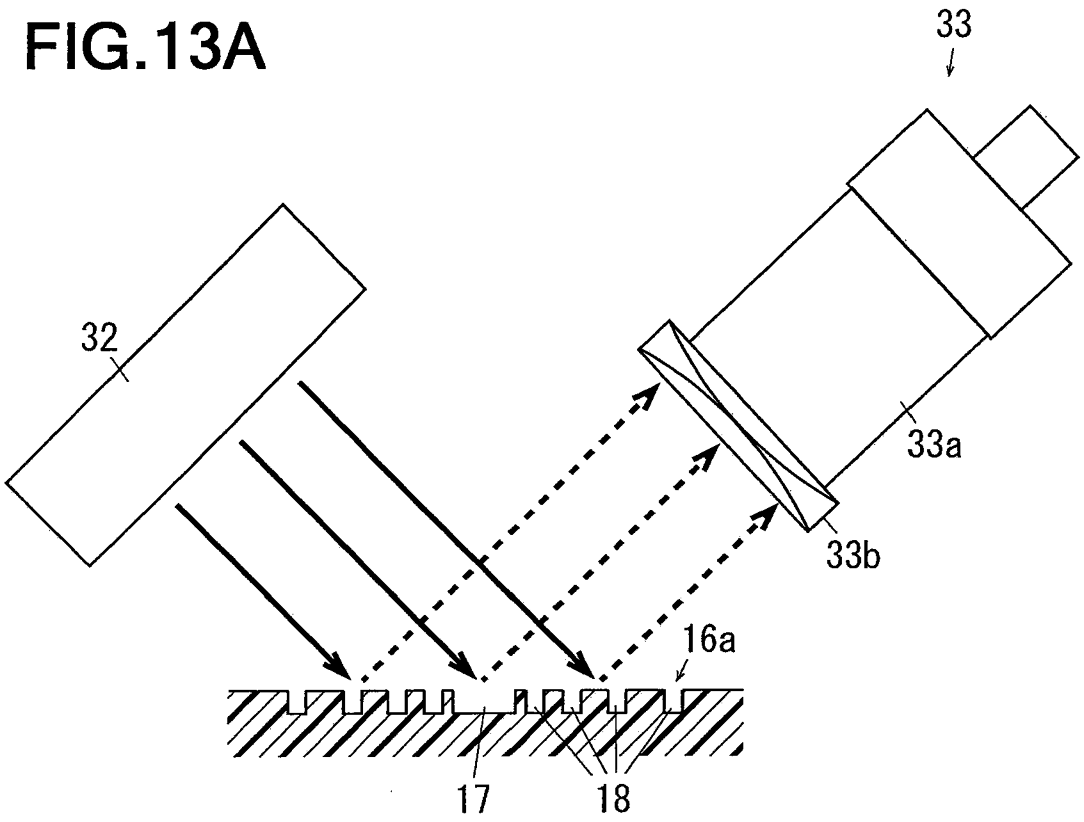
FIGS. 13A and 13B are explanatory views showing a main part of the position measuring device according to the first example, FIG. 13A being an explanatory view showing a light which is measured and FIG. 13B being an explanatory view showing an example of an image which is picked up.
Figure 13B:
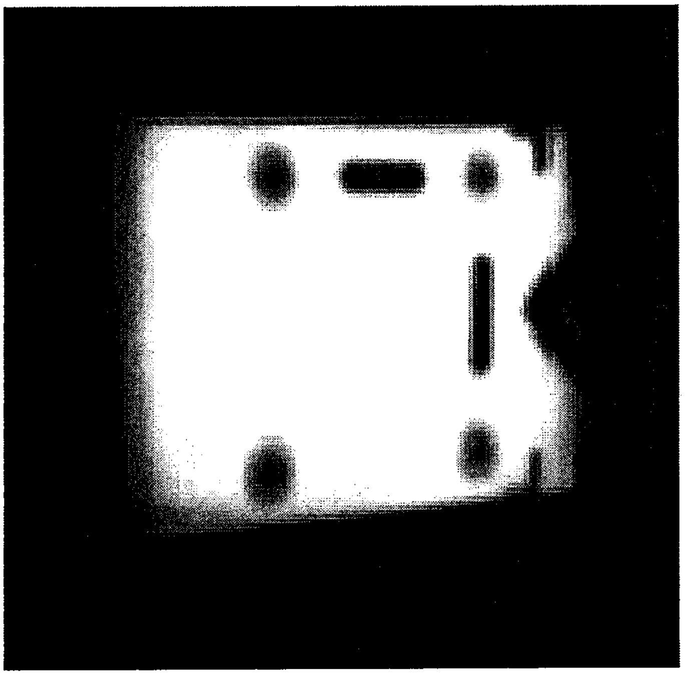

FIG. 13 is an explanatory view showing a main part of the position measuring device according to the first example, and FIG. 13A is an explanatory view showing a light which is measured and FIG. 13B is an explanatory view showing an example of an image which is picked up.

The concave portion measuring means 36*d* serves to measure a position of the marker 16 in the supply developer housing portion 2 based on a concentration distribution of a light reflected from the marker 16, passing through the lens 33*b* and received by the camera body 33*a*.

The concave portion measuring means 36*d* according to the first example serves to measure the position of the marker 16 based on the concentration distribution of the marker 16 on the basis of a result of the measurement of the camera 33 which is acquired by the image acquiring means 36*c*.

In FIG. 13, in an image photographed by the camera 33 according to the first example, an outer surface of the rear end wall 2*d* is photographed as an image having a high luminance, that is, an image having a low black concentration by a regular reflected light, and furthermore, the marker 16 and the other concave and convex portions are photographed as images having a low luminance, that is, images having a high black concentration. In other words, as illustrated in FIG. 13B, a wall surface is photographed as an image having a high luminance and the marker 16 is photographed as an image having a high concentration. In the example of an experiment shown in FIG. 13B, the marker 16 is formed on a different outer wall surface from the rear end wall 2*d* of the supply developer housing portion 2 and is photographed by the camera 33 as an example of an experiment for a firefly catching measurement.

In the first example, the firefly catching marker 16*a* is formed. The firefly catching marker 16*a* is wholly set to have an array which may be recognized in such a manner that a concentration is gradually increased toward the concave mark central position 16*a*1 side and is gradually reduced toward the peripheral edge portion. For this reason, the whole firefly catching marker 16*a* is photographed as a circular image in which the concentration is gradually increased toward the center and is gradually reduced toward the peripheral edge portion. In other words, an image having a blur impression is photographed as a whole.

A three-dimensional position of the concave mark central position 16*a*1 of the marker 16 is measured based on the technique of the firefly catching measurement from the circular image which is photographed. In other words, when a direction of an optical axis with respect to the camera 33 is set to be a Z' direction and a perpendicular plane to the Z' direction is set to be an X'Y' plane, a position having X' and Y' coordinates over the X'Y' plane is measured as a position in which the central position 16*a*1 of the circle has the highest concentration in the circular image. By utilizing the fact that a diameter of the circular image is larger when a distance to the marker 16 is greater, that is, a Z' coordinate is greater, a position having the Z' coordinate is measured from the diameter of the circular shape of the photographed image.

The concave portion measuring means 36*d* according to the first example serves to measure positions of the two groove-shaped markers 16*b* and 16*c* disposed in the four firefly catching markers 16*a*, that is, a positional relationship with the four firefly catching markers 16*a*.

The posture determining means 36*e* serves to discriminate a posture of the supply developer housing portion 2 based on the position of each of the markers 16 which is measured by the concave portion measuring means 36*d*. In other words, the posture determining means 36*e* according to the first example serves to discriminate a posture of the supply developer housing portion 2 which is varied depending on a tilt of the supply developer housing portion 2 in the pallet 26 or a tilt of the pallet 26 itself, that is, a tilt angle of the supply developer housing portion 2 with respect to the camera 33 based on three-dimensional positions of the four firefly catching markers 16*a*.

The type identifying means 36*f* serves to identify a type of the supply developer housing portion 2 based on the position of the marker 16 which is measured by the concave portion measuring means 36*d*. The type identifying means 36*f* according to the first example changes, depending on colors of Y, M, C and K, positions of the two groove-shaped markers 16*b* and 16*c* which are disposed asymmetrically with respect to the four firefly catching markers 16*a* which are disposed symmetrically, thereby identifying the type of the supply developer housing portion 2, that is, the colors of Y, M, C and K based on the positions of the groove-shaped markers 16*b* and 16*c*. Although the color is identified in the first example, the invention is not restricted thereto but the type identifying means 36*f* may also be utilized for identifying a machine type or destination of an image forming apparatus to be used, that is, an OEM destination, for instance, by changing the positions and number of the firefly catching markers 16*a* with respect to the groove-shaped markers 16*b* and 16*c*. In addition, although the type is identified by the groove-shaped markers 16*b* and 16*c* in the first example, the invention is not restricted thereto but the type identifying means 36*f* may also be utilized for identifying a direction of the supply developer housing portion 2, that is, a posture thereof based on the positions of the groove-shaped markers 16*b* and 16*c* with respect to the firefly catching marker 16*a*.

The take-out control means 36*g* serves to control an operation of the manipulator 31. The take-out control means 36*g* according to the first example repeats a work for controlling the manipulator 31 corresponding to the posture of the supply developer housing portion 2 in the pallet 26, holding the supply developer housing portion 2 by means of the manipulator 31, and furthermore, moving and putting the supply developer housing portion 2 onto the belt conveyor 29 based on a result of the discrimination which is obtained by the posture determining means 36*e* or the type identifying means 36*f*.

The position measuring devices 32 to 36 according to the first example for measuring the position of the marker 16 is constituted by the lamp 32, the camera 33 and the control portion 36.

FUNCTION OF FIRST EXAMPLE

In the position measuring devices 32 to 36 according to the first example which has the structures described above, the concave marker 16 formed on the supply developer housing portion 2 is measured so that the position of the marker 16 is measured and the posture or type is discriminated and identified based on the position of the marker 16.

With the conventional structure, an LED light source is used as a marker, a convex solid marker is used or a sticker having a marker printed thereon is put. However, there is a problem in that a cost is increased and an installation place has restrictions when the LED is provided or the solid marker is used in order to discriminate the posture or type. In the case in which the LED or solid marker is provided or the sticker is put, moreover, there is a problem in that a precision is deteriorated due to an error of an installing or putting work or an individual difference in each component.

On the other hand, in the first example, the marker 16 constituted by the concave portion is used and it is not necessary to provide an LED or to carry out printing when fabricating the supply developer housing portion 2. Consequently, a cost of the fabrication may be reduced. In the first example, particularly, the marker 16 is applied by using the marker applying portion 21*a* of the mold 21, and the fabrication is carried out in molding so that the cost may be reduced. In addition, a positional shift for an individual piece of the supply developer housing portion 2 which is created is rarely made so that a precision in a measurement of a position may be enhanced.

In the first example, furthermore, the position of the marker 16 is measured by utilizing the firefly catching measurement. As in the prior art such as the Patent Document 1, in the case in which a simple geometrical pattern such as a combination of circular and square shapes is employed to carry out photographing by means of a camera, there is a problem in that a precision in a measurement of a distance from a component may not be sufficiently obtained and a precision in a work for holding the component through a manipulator is deteriorated. On the other hand, by using the firefly catching measurement as in the first example, it is possible to sufficiently obtain a precision in a measurement of a distance from the supply developer housing portion 2 according to an example of a component with a simple structure. Thus, it is possible to enhance a precision in a work for causing the manipulator 31 to hold the component as compared with the prior art.

SECOND EXAMPLE

Figure 14:
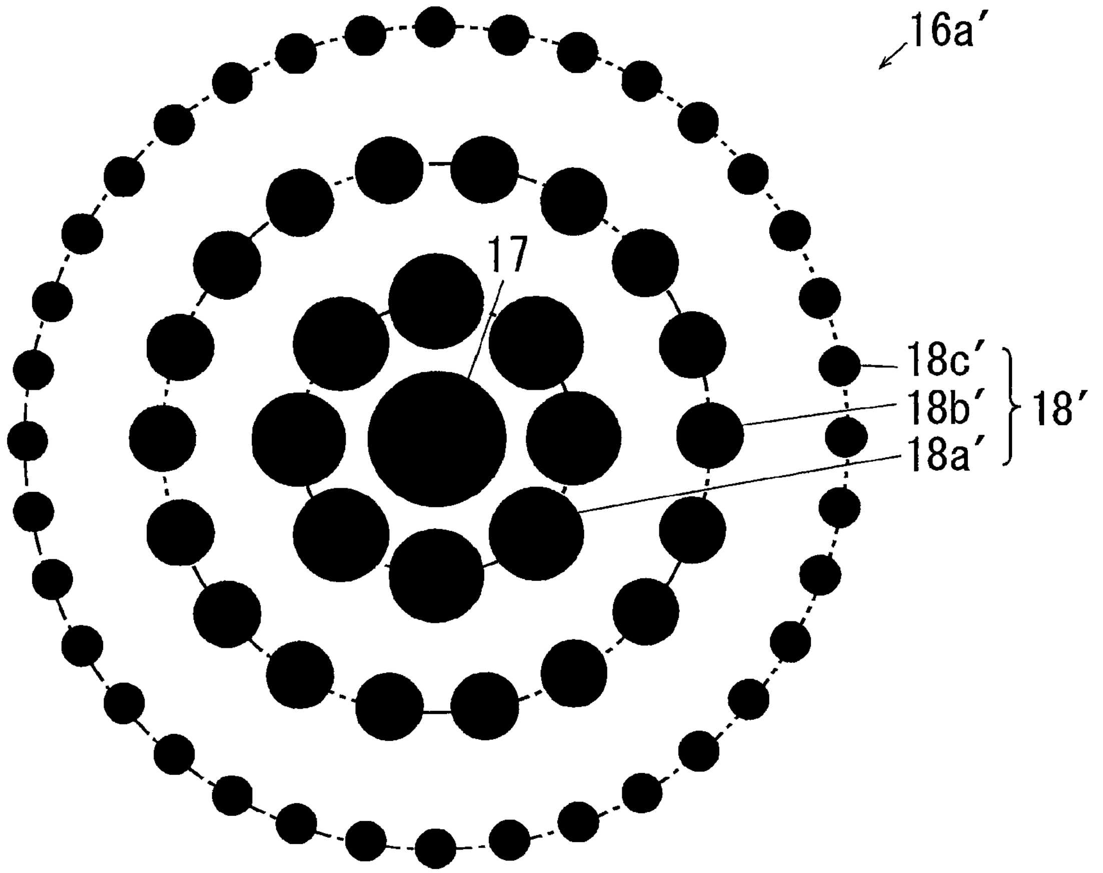
FIG. 14 is an explanatory view showing a marker according to an example of a concave mark in accordance with a second example, corresponding to FIG. 9A in the first example.

FIG. 14 is an explanatory view showing a marker according to an example of a concave portion in accordance with a second example, corresponding to FIG. 9A in the first example.

Next, the second example according to the invention will be described. In the description of the second example, components corresponding to the components in the first example have the same reference numerals and detailed explanation thereof will be omitted.

The second example is different from the first example in the following respects and has the same structure as that of the first example in the other respects.

In FIG. 14, in a firefly catching marker 16*a*' according to the second example, the number of peripheral edge concave portions is set to be three, that is, first to third peripheral edge concave portions 18*a*' to 18*c*' differently from the first example in which the number of the peripheral edge concave portions is four.

A central concave portion 17 according to the second example is formed to take a shape of a cylinder having a diameter of 1 mm and a depth of 0.5 mm.

The first peripheral edge concave portion 18*a*' has a center disposed on a concentric circle having a radius of 1 mm from a concave mark central position 16*a*1. Eight first peripheral edge concave portions 18*a*' in total are disposed at an interval of 45 degrees over the concentric circle. Each of the peripheral edge concave portions 18*a*' is formed to take a shape of a cylinder having a diameter of 0.7 mm and a depth of 0.5 mm.

The second peripheral edge concave portion 18*b*' has a center disposed on a concentric circle having a radius of 2 mm from the concave mark central position 16*a*1. Eighteen second peripheral edge concave portions 18*b*' in total are disposed at an interval of 20 degrees over the concentric circle. Each of the peripheral edge concave portions 18*b*' is formed to take a shape of a cylinder having a diameter of 0.5 mm and a depth of 0.5 mm.

The third peripheral edge concave portion 18*c*' has a center disposed on a concentric circle having a radius of 3 mm from the concave mark central position 16*a*1. Thirty-six third peripheral edge concave portions 18*c*' in total are disposed at an interval of 10 degrees over the concentric circle. Each of the peripheral edge concave portions 18*c*' is formed to take a shape of a cylinder having a diameter of 0.3 mm and a depth of 0.5 mm.

In the firefly catching marker 16*a*' according to the second example, accordingly, a hole diameter of the concave portion is gradually reduced toward an outside of the concentric circle, and furthermore, a diameter of the concentric circle is set at an equal interval of 1 mm. Therefore, the whole firefly catching marker 16*a*' according to the second example also has an array which may be recognized in such a manner that a concentration is gradually increased toward the concave mark central position 16*a*1 side and is gradually reduced toward the peripheral edge portion.

FUNCTION OF SECOND EXAMPLE

Also in position measuring devices 32 to 36 according to the second example which have the structures described above, in the same manner as in the first example, the firefly catching marker 16' constituted by the concave portion is formed. By utilizing the technique of a firefly catching measurement, it is possible to measure a position at a lower cost with a higher precision as compared with the prior art.

THIRD EXAMPLE

Figure 15A:
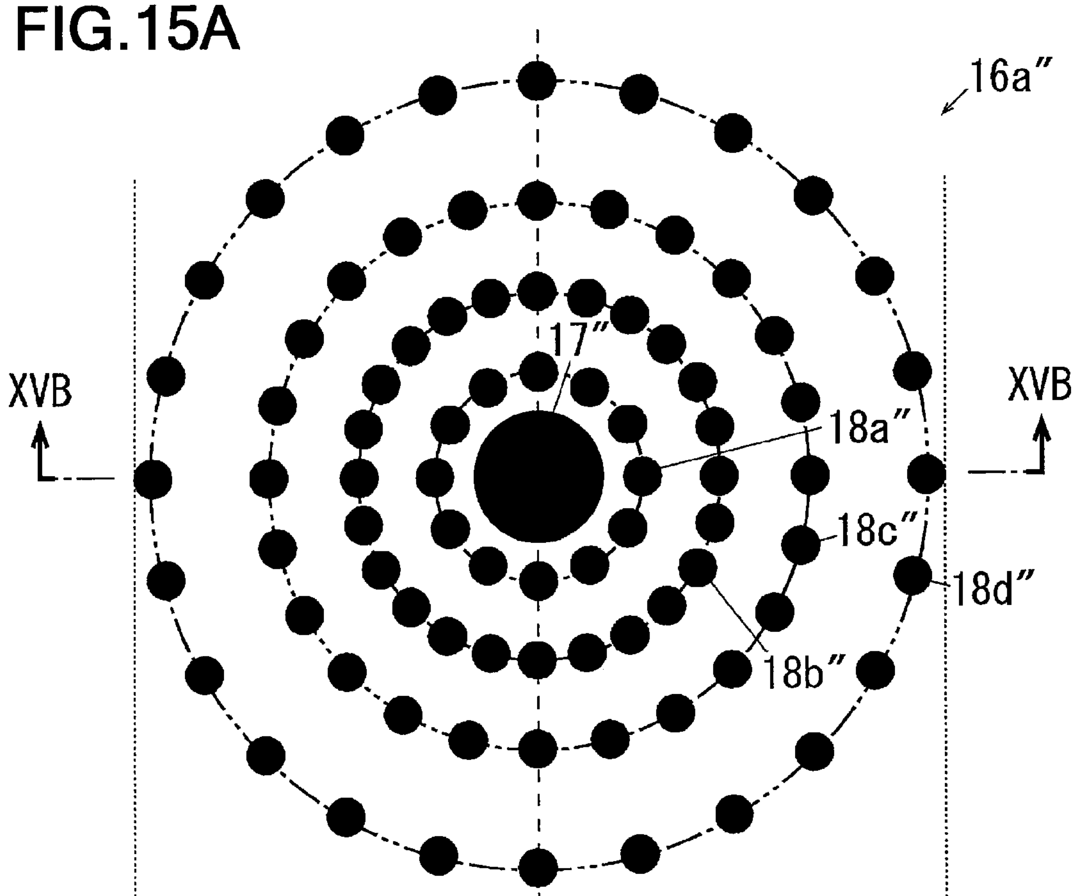
FIGS. 15A and 15B are explanatory views showing a marker according to an example of a concave mark in accordance with a third example, FIG. 15A being an enlarged view showing a main part of the marker corresponding to FIG. 9A in the first example and FIG. 15B being a sectional view taken along an XVB-XVB line in FIG. 15A.
Figure 15B:
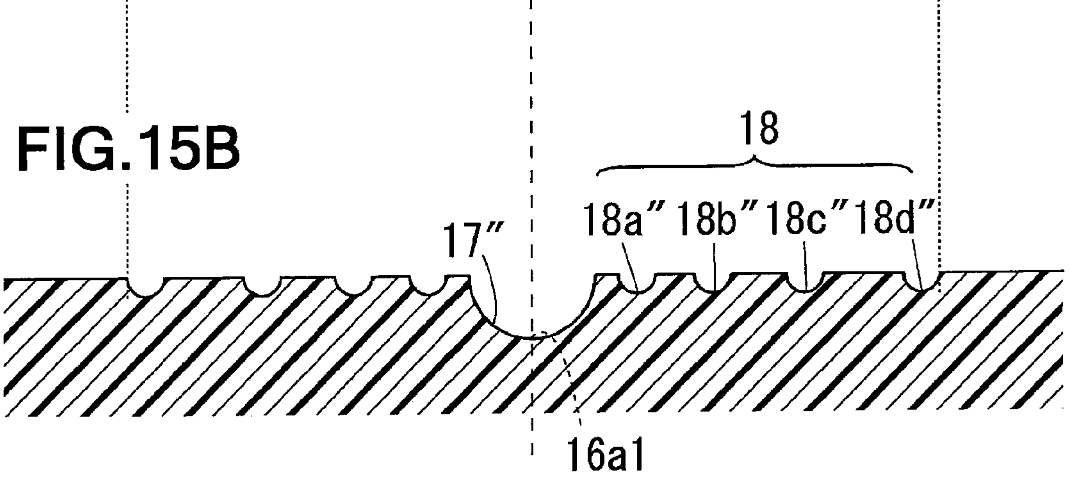

FIG. 15 is an explanatory view showing a marker according to an example of a concave portion in accordance with a third example, and FIG. 15A is an enlarged view showing a main part of the marker corresponding to FIG. 9A in the first example and FIG. 15B is a sectional view taken along an XVB-XVB line in FIG. 15A.

Next, the third example according to the invention will be described. In the description of the third example, components corresponding to the components in the first example have the same reference numerals and detailed explanation thereof will be omitted.

The third example is different from the first example in the following respects and has the same structure as that of the first example in the other respects.

In FIG. 15, in a firefly catching marker 16*a*" according to the third example, a semispherical shape according to an example of a partially spherical shape is taken as shown in FIG. 15 differently from the concave portions 17 and 18 according to the first example which are formed cylindrically. In other words, each of concave portions 17" and 18" is set to have a depth corresponding to a radius of a hole. The invention is not restricted to the semispherical shape but the firefly catching marker 16*a*" may be constituted by a partially spherical concave portion having a smaller or greater central angle than a semisphere having a central angle of 180 degrees.

FUNCTION OF THIRD EXAMPLE

In position measuring devices 32 to 36 according to the third example which have the structures described above, the firefly catching marker 16*a*" constituted by the semispherical concave portion is formed. In the same manner as in the first example, by utilizing the technique of the firefly catching measurement, it is possible to measure a position at a lower cost with a higher precision as compared with the prior art.

FOURTH EXAMPLE

Figure 16A:
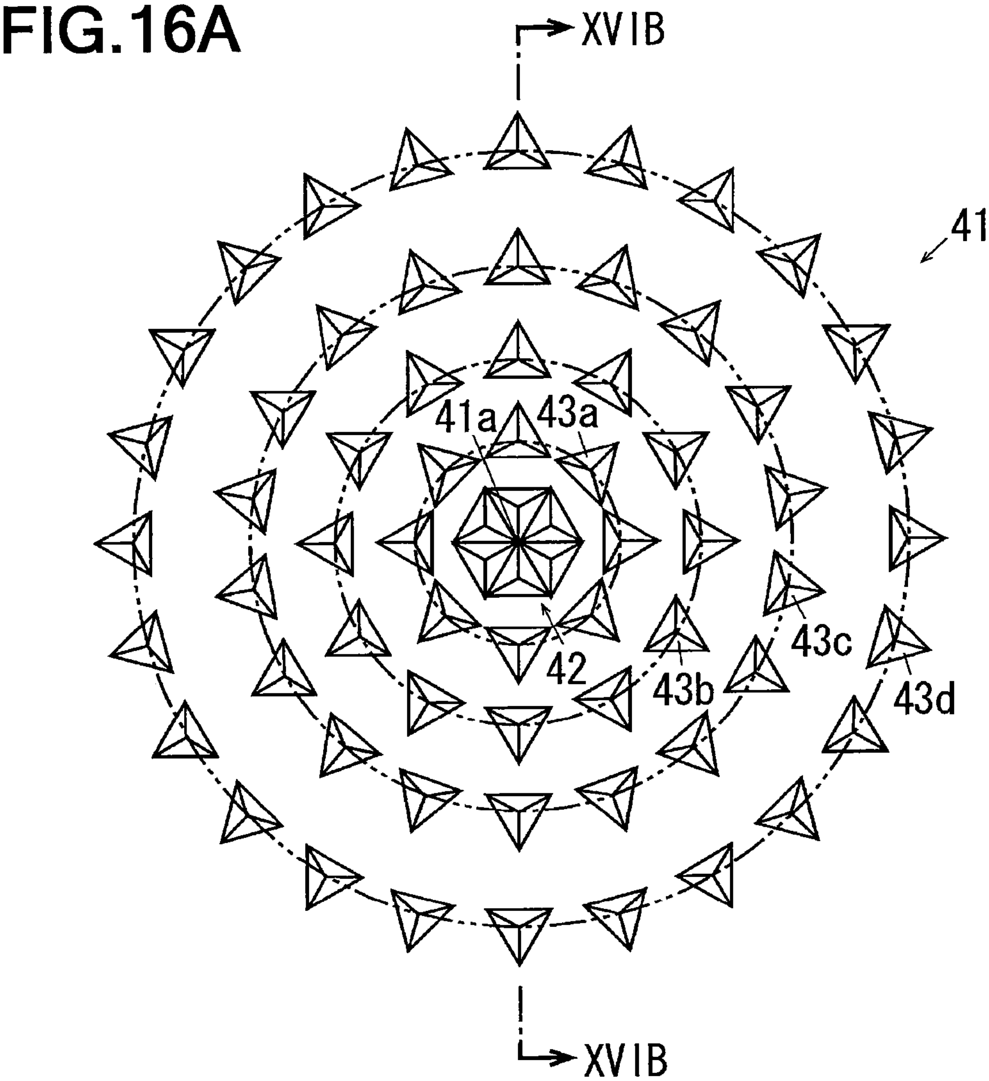
FIGS. 16A to 16D are explanatory views showing a marker according to an example of a concave mark in accordance with a fourth example, FIG. 16A being an enlarged view showing a main part of the marker corresponding to FIG. 9A in the first example, FIG. 16B being a sectional view taken along an XVIB-XVIB line in FIG. 16A, FIG. 16C being an enlarged view showing a main part of a single concave portion, and FIG. 16D being a sectional view taken along an XVID-XVID line in FIG. 16C.
Figure 16B:
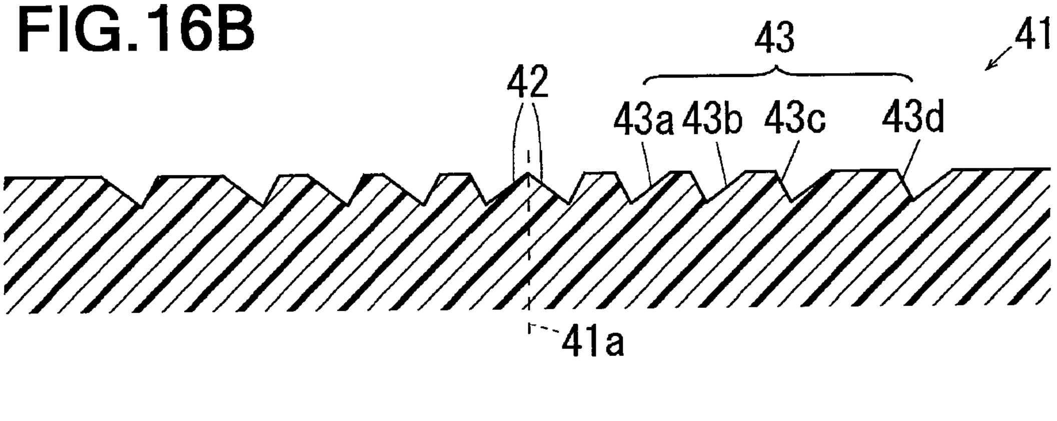
Figure 16C:
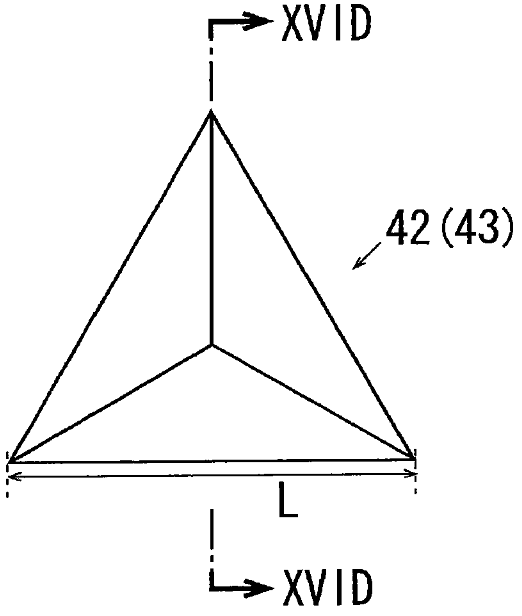
Figure 16D:
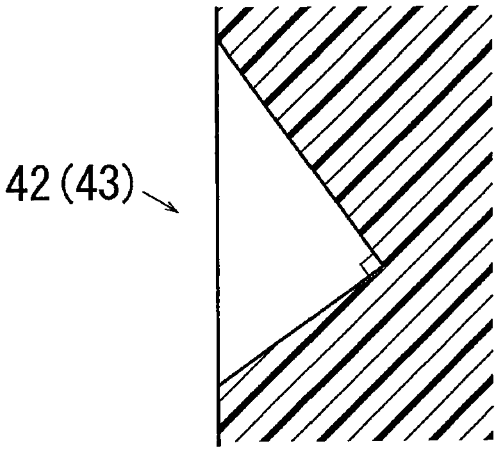

FIG. 16 is an explanatory view showing a marker according to an example of a concave portion in accordance with a fourth example, and FIG. 16A is an enlarged view showing a main part of the marker corresponding to FIG. 9A in the first example, FIG. 16B is a sectional view taken along an XVIB-XVIB line in FIG. 16A, FIG. 16C is an enlarged view showing a main part of a single concave portion, and FIG. 16D is a sectional view taken along an XVID-XVID line in FIG. 16C.

Next, the fourth example according to the invention will be described. In the description of the fourth example, components corresponding to the components in the first example have the same reference numerals and detailed explanation thereof will be omitted.

The fourth example is different from the first example in the following respects and has the same structure as that of the first example in the other respects.

In FIG. 16, a firefly catching marker 41 according to the fourth example has a central concave portion 42 according to an example of a first concave portion which is formed in a concave mark central position 41*a* and a plurality of peripheral edge concave portions 43 according to an example of a second concave portion which is disposed on a concentric circle setting a concave mark central position 41*a*1 as a center. The peripheral edge concave portion 43 according to the fourth example has first to fourth peripheral edge concave portions 43*a* to 43*d* which are disposed on four concentric circles in the same manner as in the first example.

The central concave portion 42 and the peripheral edge concave portion 43 according to the fourth example have a structure in which a light irradiated from a lamp 32 is reflected in a reverse advancing direction and are formed by a concave portion taking a shape of a triangular pyramid, that is, a concave portion of a corner cube type as shown in FIG. 16 according to an example of a concave portion of a retroreflection type.

In the fourth example, the central concave portion 42 is constituted by a combination of six concave portions 44 taking a shape of a triangular pyramid to form a regular triangular opening having a side L to be L=0.577 mm=$1/(3^{1/2})$ as shown in FIGS. 16C and 16D with the concave mark central position 41*a* set to be a common apex.

The first peripheral edge concave portion 43*a* is disposed on a concentric circle having a radius of 0.8 mm from the concave mark central position 41*a* in such a manner that a position of gravity of the triangular pyramid of each concave portion 43*a* corresponds thereto, and eight first peripheral edge concave portions 43*a* in total are disposed at an interval of 45 degrees over the concentric circle. Each of the peripheral edge concave portions 43*a* is formed in the same manner as the concave portion 44 taking the triangular pyramid shown in FIGS. 16C and 16D.

The second peripheral edge concave portion 43*b* is disposed on a concentric circle having a radius of 1.4 mm from the concave mark central position 41*a* in such a manner that a position of gravity of the triangular pyramid of each concave portion 43*b* corresponds thereto, and twelve second peripheral edge concave portions 43*b* in total are disposed at an interval of 30 degrees over the concentric circle. Each of the peripheral edge concave portions 43*b* is constituted by the concave portion 44 in the same manner as the first peripheral edge concave portion 43*a*.

The third peripheral edge concave portion 43*c* is disposed on a concentric circle having a radius of 2.1 mm from the concave mark central position 41*a* in such a manner that a position of gravity of the triangular pyramid of each concave portion 43*c* corresponds thereto, and eighteen third peripheral edge concave portions 43*c* in total are disposed at an interval of 20 degrees over the concentric circle. Each of the peripheral edge concave portions 43*c* is constituted by the concave portion 44 in same manner as the first peripheral edge concave portion 43*a*.

The fourth peripheral edge concave portion 43*d* is disposed on a concentric circle having a radius of 3 mm from the concave mark central position 41*a* in such a manner that a position of gravity of the triangular pyramid of each concave portion 43*d* corresponds thereto, and twenty-four fourth peripheral edge concave portions 43*d* in total are disposed at an interval of 15 degrees over the concentric circle. Each of the peripheral edge concave portions 43*d* is constituted by the concave portion 44 in same manner as the first peripheral edge concave portion 43*a*.

Accordingly, the firefly catching marker 41 according to the fourth example wholly has an array which may be recognized in such a manner that a density and a concentration are gradually increased toward the concave mark central position 41*a* side and are gradually reduced toward the peripheral edge portion as shown in FIG. 16A.

Figure 17A:
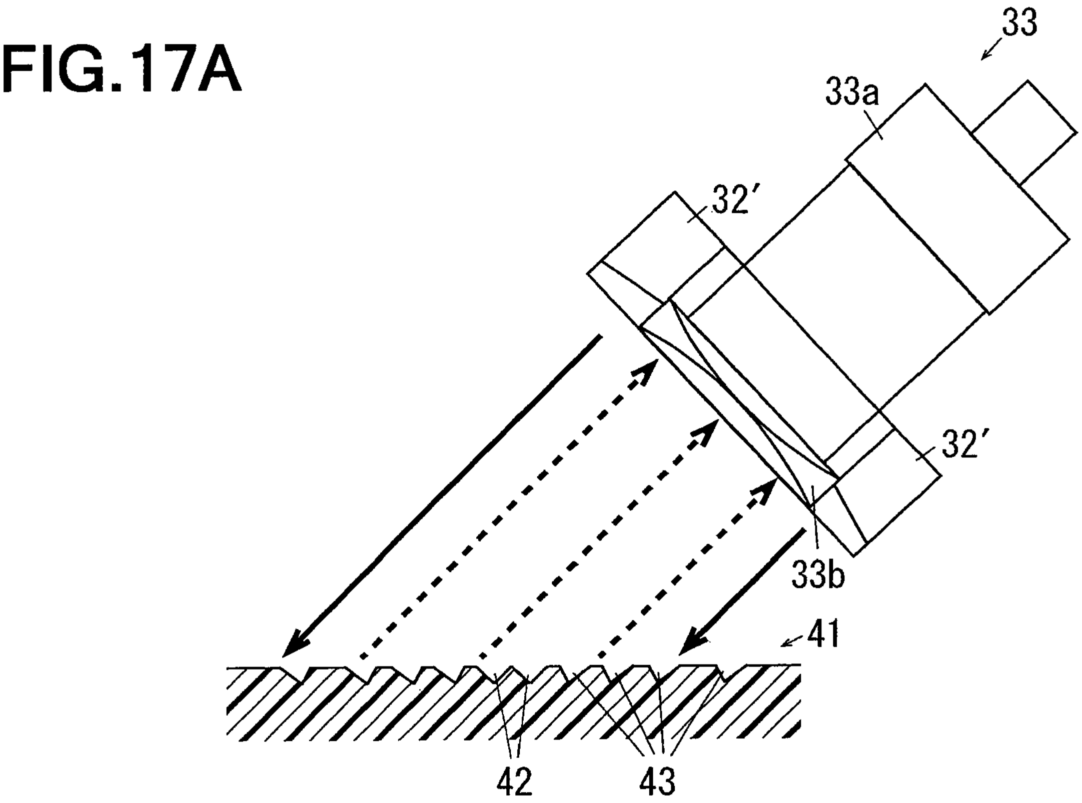
FIGS. 17A and 17B are explanatory views showing a main part of a position measuring device according to the fourth example, FIG. 17A being an explanatory view showing a light which is measured and FIG. 17B being an explanatory view showing an example of an image which is picked up.
Figure 17B:
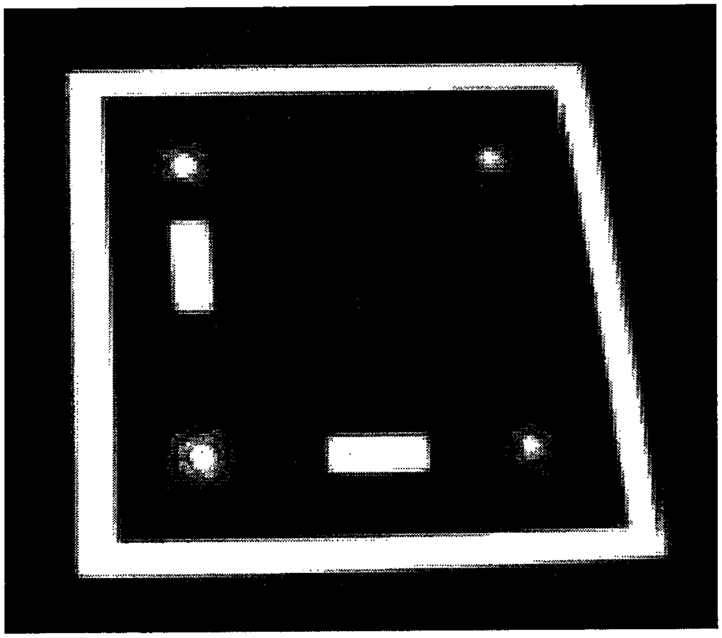

FIG. 17 is an explanatory view showing a main part of a position measuring device according to the fourth example, and FIG. 17A is an explanatory view showing a light which is measured and FIG. 17B is an explanatory view showing an example of an image which is picked up.

In FIG. 17, in the position measuring device according to the fourth example, a lamp 32' according to an example of a light source portion is disposed like a ring to surround a camera 33. In other word, the camera 33 and the lamp 32' are disposed adjacently to each other.

In an image photographed by the camera 33 according to the fourth example in FIG. 17, therefore, an image of a regular reflected light on a wall surface is rarely picked up and is photographed as an image having a high black concentration, and furthermore, a marker 41 of a retroreflection type is photographed as an image having a high luminance, that is, a low black concentration. In other words, as is illustrated in FIG. 17B, the wall surface is photograph as an image having a high concentration and the marker 41 is photographed as an image having a concentration which is gradually reduced toward a center and is gradually increased toward a peripheral edge. In an example of an experiment shown in FIG. 17B, the marker 41 is formed on a film formed by a resin and an image thereof is picked up by the camera 33 as an example of an experiment for a firefly catching measurement.

FUNCTION OF FOURTH EXAMPLE

In the position measuring device according to the fourth example which has the structure described above, there is formed the firefly catching marker 41 of the retroreflection type which is constituted by a concave portion taking a shape of a triangular pyramid. In the same manner as in the first example, by utilizing the technique of the firefly catching measurement, it is possible to measure a position at a lower cost with a higher precision as compared with the prior art.

Moreover, the camera 33 and the lamp 32' may be disposed adjacently to each other. As compared with a structure in which it is necessary to dispose the camera 33 and the lamp 32' apart from each other in order to measure a regular reflected light, consequently, it is possible to reduce a size of the whole position measuring device.

FIFTH EXAMPLE

Figure 18:
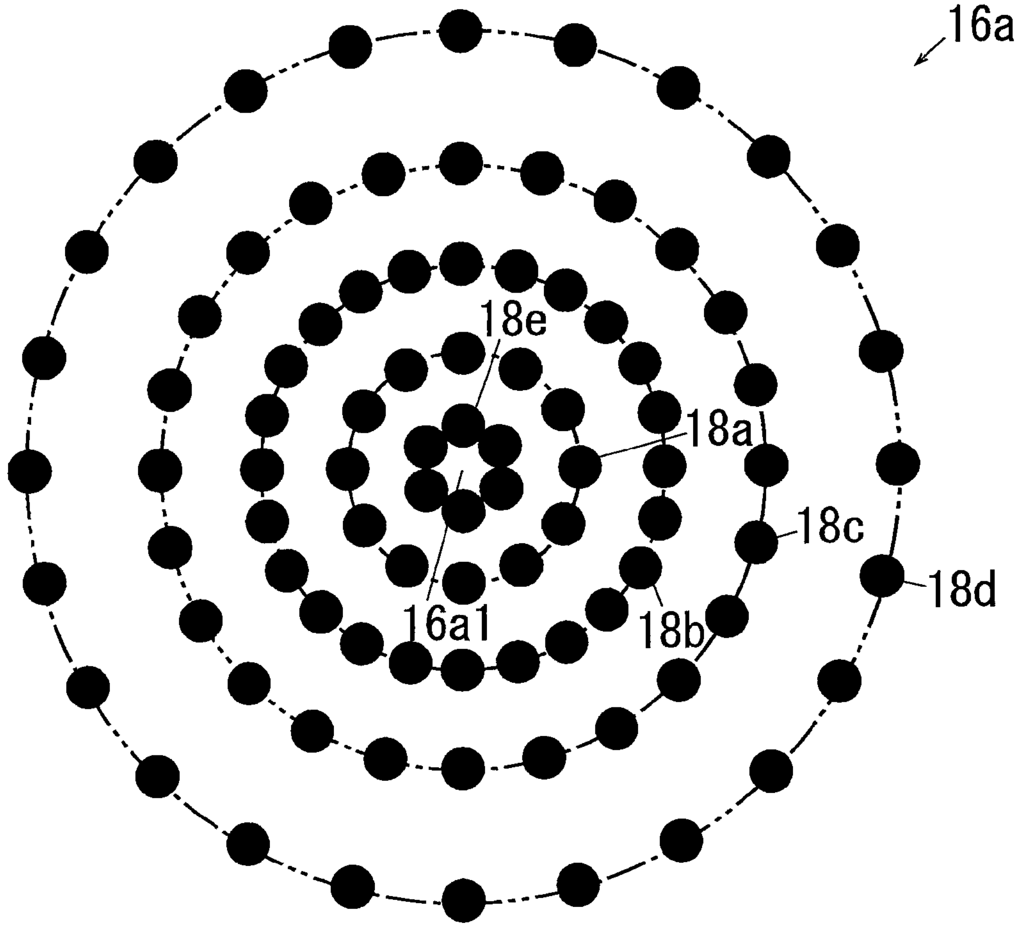
FIG. 18 is an explanatory view showing a marker according to an example of a concave portion in accordance with a fifth example, corresponding to FIG. 9A in the first example.

FIG. 18 is an explanatory view showing a marker according to an example of a concave portion in accordance with the fifth example, corresponding to FIG. 9A in the first example.

Next, the fifth example according to the invention will be described. In the description of the fifth example, components corresponding to the components in the first example have the same reference numerals and detailed explanation thereof will be omitted.

The fifth example is different from the first example in the following respects and has the same structure as that of the first example in the other respects.

In FIG. 18, in a firefly catching marker 41' according to the fifth example, the central concave portion 17 in the firefly catching marker 16*a* according to the first example is omitted and a fifth peripheral edge concave portion 18*e* is disposed on a centric circle at an inside of a first peripheral edge concave portion 18*a*. For the fifth peripheral edge concave portion 18*e* according to the fifth example, six cylindrical concave portions having a diameter of 0.3 mm and a depth of 0.5 mm are formed in the same manner as the first peripheral edge concave portion 18*a*. In other words, in the firefly catching marker 41' according to the fifth example, all of the concave portions 18*a* to 18*e* are formed to have the same shape.

Accordingly, the whole firefly catching marker 41' according to the fifth example also has an array which may be recognized in such a manner that densities and concentrations of the concave portions 18*a* to 18*e* are gradually increased toward a concave mark central position 16*a*1 side and are gradually reduced toward the peripheral edge portions.

FUNCTION OF FIFTH EXAMPLE

Also in position measuring devices 32 to 36 according to the fifth example which has the structure described above, in the same manner as in the first example, there is formed the firefly catching marker 41' constituted by the concave portion. By utilizing the technique of the firefly catching measurement, it is possible to measure a position at a lower cost with a higher precision as compared with the prior art.

(Variant)

Although the examples according to the invention are described above in detail, the invention is not restricted to thereto but various changes may be made within the gist of the invention described in the claims. Variants (H01) to (H06) according to the invention will be illustrated below.

(H01) Although the printer U is illustrated as an example of the image forming apparatus in the examples, the invention is not restricted thereto but the image forming apparatus may be constituted by a copying machine, a FAX or a composite machine having some or all of their functions, for instance. Although an image forming apparatus using developers having four colors is illustrated, moreover, the invention is not restricted thereto but can also be applied to an image forming apparatus using a simple color or an image forming apparatus using developers having two, three or five colors or more.

(H02) Although the supply developer housing portion 2 is illustrated as the target on which the marker is to be formed in the examples, the invention is not restricted thereto but may be applied to other members constituting the toner cartridges TCy to TCk or optional members other than the toner cartridges TCy to TCk. In addition, it is also possible to apply the marker to the pallet 26 according to an example of the container accommodating the supply developer housing portion 2 according to an example of an accommodated substance, thereby measuring the tilt angle, that is, the posture of the pallet 26 according to an example of the target.

(H03) Although there is illustrated the structure using the position measuring device in the assembly of the toner cartridges TCy to TCk in the examples, the invention is not restricted thereto but it is possible to use the position measuring device in an assembly of other components or in a decision whether a direction or posture is wrong or an image forming apparatus is installed horizontally when it is to be provided in a delivery destination.

(H04) In the examples, the number and shape of the concave portions and specific numeric values of the hole diameter, the diameter of the concentric circle and the depth are not restricted to the structures illustrated in the examples but may be optionally changed depending on a design or a specification. Moreover, it is possible to detect the posture by providing at least three firefly catching markers. Depending on the posture, however, there is a possibility that an image might be picked up to cause an overlap of two markers. For this reason, it is more desirable to provide at least four firefly catching markers. Furthermore, it is also possible to discriminate the type by using at least five firefly catching markers to replace the disposition depending on the type of the component.

(H05) Although there is employed the structure in which the two groove-shaped markers 16*b* and 16*c* are provided and the four firefly catching markers have the same shape in the examples, the invention is not restricted thereto but it is also possible to discriminate the posture without the groove-shaped markers 16*b* and 16*c* by asymmetrically disposing two firefly catching markers 16*a* according to the first example and two firefly catching markers 16' according to the second example in the four markers, for instance. In addition, the invention is not restricted to the structure in which they are disposed on four corners of the square but it is also possible to discriminate the posture or the type through only the firefly catching marker without the groove-shaped markers 16*b* and 16*c* by shifting the positions in which the four markers are to be disposed from the four corners and asymmetrically providing them.

(H06) In the examples, the array according to the fifth example can also be applied to the first to fourth examples. In other words, it is also possible to omit the central concave portions 17 and 17". Although all of the peripheral edge concave portions 18*a* to 18*e* according to the fifth example are set to have the same shape, moreover, the invention is not restricted thereto but it is also possible to vary the diameter or the number.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. A position measuring device comprising:

a plurality of concave marks that is formed on an external wall of an object to be a measuring target, each of the plurality of the concave marks including a plurality of concave portions disposed on a concentric circle with a preset concave mark central position to be a center of the concentric circle, the concave portions being provided so that densities of the concave portions become lower as distances from the concave mark central position become longer in each of the concave marks;

a light source portion that irradiates the object with an irradiating light;

a light receiving portion that receives a reflected light from the object, the refracted light being originated from the irradiating light; and a concave portion measuring portion that measures each of three-dimensional positions of the concave marks based on a concentration distribution of the reflected light received by the light receiving portion.

2. The position measuring device according to claim 1, wherein the number of the concave marks is at least four, the position measuring device further comprising a posture determining unit that determines a posture of the object based on the three-dimensional positions.

3. The position measuring device according to claim 1, wherein the plurality of the concave marks are formed on the object at a plurality of preset positions depending on a type of the object; and the position measuring device further comprising a type identifying portion that identifies the type of the object based on the three-dimensional positions.

4. The position measuring device according to claim 2, wherein the plurality of the concave marks are formed on the object at a plurality of preset positions depending on a type of the object; and the position measuring device further comprising a type identifying portion that identifies the type of the object based on the three-dimensional positions.

5. The position measuring device according to claim 1 wherein the object includes a container in which a plurality of housing portions capable of accommodating a substance to be accommodated is formed.

6. The position measuring device according to claim 1, wherein the concave portions in each of the concave marks include a first concave portion formed in the concave mark central position and a plurality of second concave portions disposed on the concentric circle.

7. The position measuring device according to claim 6, wherein the first concave portion has a spherical concave curve with a first curvature radius, and the second concave portion has a spherical concave curve with a second curvature radius smaller than the first curvature radius.

8. The position measuring device according to claim 6, wherein the light source is disposed adjacently to the light receiving portion, and each of the concave marks is formed as a retroreflection type which reflects a light from the light source portion toward the light receiving portion.

* * * * *